United States Patent
Tichenor et al.

(10) Patent No.: US 11,227,445 B1
(45) Date of Patent: Jan. 18, 2022

(54) ARTIFICIAL REALITY AUGMENTS AND SURFACES

(71) Applicant: Facebook Technologies, LLC, Menlo Park, CA (US)

(72) Inventors: James Tichenor, Seattle, WA (US); Arthur Zwiegincew, Medina, WA (US); Hayden Schoen, Tacoma, WA (US); Alex Marcolina, Fremont, CA (US); Gregory Alt, Seattle, WA (US); Todd Harris, Woodinville, WA (US); Merlyn Deng, Palo Alto, CA (US); Barrett Fox, Berkeley, CA (US); Michal Hlavac, Seattle, WA (US)

(73) Assignee: Facebook Technologies, LLC, Menlo Park, CA (US)

(*) Notice: Subject to any disclaimer, the term of this patent is extended or adjusted under 35 U.S.C. 154(b) by 0 days.

(21) Appl. No.: 17/008,487

(22) Filed: Aug. 31, 2020

(51) Int. Cl.
*G09G 5/00* (2006.01)
*G06T 19/00* (2011.01)
(Continued)

(52) U.S. Cl.
CPC .......... *G06T 19/006* (2013.01); *G06K 9/6217* (2013.01); *G06T 7/60* (2013.01);
(Continued)

(58) Field of Classification Search
CPC .............................. G06T 19/003; G06T 19/20
See application file for complete search history.

(56) References Cited

U.S. PATENT DOCUMENTS

| | | |
|---|---|---|
| 770,149 A | 9/1904 | Bailey |
| 6,842,175 B1 | 1/2005 | Schmalstieg et al. |

(Continued)

FOREIGN PATENT DOCUMENTS

| | | |
|---|---|---|
| EP | 2887322 B1 | 2/2020 |
| WO | 2018235371 A1 | 12/2018 |

OTHER PUBLICATIONS

"Unity Gets Toolkit for Common AR/VR Interactions" [accessed Apr. 7, 2020]. Unity XR Interaction Toolkit Preview Dec. 19, 2019.
(Continued)

*Primary Examiner* — Charles Tseng
(74) *Attorney, Agent, or Firm* — Potomac Law Group, PLLC

(57) ABSTRACT

Aspects of the present disclosure are directed to providing an artificial reality environment with augments and surfaces. An "augment" is a virtual container in 3D space that can include presentation data, context, and logic. An artificial reality system can use augments as the fundamental building block for displaying 2D and 3D models in the artificial reality environment. For example, augments can represent people, places, and things in an artificial reality environment and can respond to a context such as a current display mode, time of day, a type of surface the augment is on, a relationship to other augments, etc. Augments can be on a "surface" that has a layout and properties that cause augments on that surface to display in different ways. Augments and other objects (real or virtual) can also interact, where these interactions can be controlled by rules for the objects evaluated based on information from the shell.

20 Claims, 21 Drawing Sheets

(51) Int. Cl.
*G06T 19/20* (2011.01)
*G06T 7/60* (2017.01)
*G06K 9/62* (2006.01)
*G06T 7/70* (2017.01)

(52) U.S. Cl.
CPC .............. *G06T 7/70* (2017.01); *G06T 19/20* (2013.01); *G06T 2200/24* (2013.01); *G06T 2207/20081* (2013.01); *G06T 2219/2004* (2013.01)

(56) References Cited

U.S. PATENT DOCUMENTS

| | | | |
|---|---|---|---|
| 8,558,759 B1 | 10/2013 | Gomez et al. | |
| 8,947,351 B1 | 2/2015 | Noble | |
| 9,081,177 B2 | 7/2015 | Wong et al. | |
| 9,117,274 B2 | 8/2015 | Liao et al. | |
| 9,292,089 B1 | 3/2016 | Sadek | |
| 9,477,368 B1 | 10/2016 | Filip et al. | |
| 9,530,252 B2 | 12/2016 | Poulos et al. | |
| 9,817,472 B2 | 11/2017 | Lee et al. | |
| 10,220,303 B1 | 3/2019 | Schmidt et al. | |
| 10,248,284 B2 | 4/2019 | Itani et al. | |
| 10,473,935 B1 | 11/2019 | Gribetz et al. | |
| 10,521,944 B2 | 12/2019 | Sareen et al. | |
| 2008/0089587 A1 | 4/2008 | Kim et al. | |
| 2010/0306716 A1 | 12/2010 | Perez | |
| 2011/0267265 A1 | 11/2011 | Stinson | |
| 2012/0069168 A1 | 3/2012 | Huang et al. | |
| 2012/0143358 A1 | 6/2012 | Adams et al. | |
| 2012/0188279 A1 | 7/2012 | Demaine | |
| 2012/0206345 A1 | 8/2012 | Langridge | |
| 2012/0275686 A1 | 11/2012 | Wilson et al. | |
| 2012/0293544 A1 | 11/2012 | Miyamoto et al. | |
| 2013/0063345 A1 | 3/2013 | Maeda | |
| 2013/0125066 A1 | 5/2013 | Klein et al. | |
| 2013/0147793 A1 | 6/2013 | Jeon et al. | |
| 2013/0265220 A1 | 10/2013 | Fleischmann et al. | |
| 2014/0125598 A1 | 5/2014 | Cheng et al. | |
| 2014/0236996 A1 | 8/2014 | Masuko et al. | |
| 2014/0357366 A1 | 12/2014 | Koganezawa et al. | |
| 2014/0375683 A1 | 12/2014 | Salter et al. | |
| 2014/0375691 A1 | 12/2014 | Kasahara | |
| 2015/0035746 A1 | 2/2015 | Cockburn et al. | |
| 2015/0054742 A1 | 2/2015 | Imoto et al. | |
| 2015/0062160 A1 | 3/2015 | Sakamoto et al. | |
| 2015/0077592 A1 | 3/2015 | Fahey | |
| 2015/0153833 A1 | 6/2015 | Pinault et al. | |
| 2015/0160736 A1 | 6/2015 | Fujiwara | |
| 2015/0169076 A1 | 6/2015 | Cohen et al. | |
| 2015/0181679 A1 | 6/2015 | Liao et al. | |
| 2015/0206321 A1 | 7/2015 | Scavezze et al. | |
| 2015/0220150 A1 | 8/2015 | Plagemann et al. | |
| 2015/0261659 A1 | 9/2015 | Bader et al. | |
| 2015/0356774 A1* | 12/2015 | Gal | G06T 19/20 345/633 |
| 2016/0110052 A1 | 4/2016 | Kim et al. | |
| 2016/0147308 A1 | 5/2016 | Gelman et al. | |
| 2016/0170603 A1 | 6/2016 | Bastien et al. | |
| 2016/0378291 A1 | 12/2016 | Pokrzywka | |
| 2017/0060230 A1 | 3/2017 | Faaborg et al. | |
| 2017/0076500 A1* | 3/2017 | Maggiore | G06T 19/006 |
| 2017/0109936 A1 | 4/2017 | Powderly et al. | |
| 2017/0139478 A1 | 5/2017 | Jeon et al. | |
| 2017/0192513 A1 | 7/2017 | Karmon et al. | |
| 2017/0262063 A1 | 9/2017 | Blénessy et al. | |
| 2017/0278304 A1 | 9/2017 | Hildreth et al. | |
| 2017/0287225 A1 | 10/2017 | Powderly et al. | |
| 2017/0296363 A1 | 10/2017 | Yetkin et al. | |
| 2017/0323488 A1* | 11/2017 | Mott | G06T 19/006 |
| 2017/0364198 A1 | 12/2017 | Yoganandan et al. | |
| 2018/0059901 A1 | 3/2018 | Gullicksen | |
| 2018/0113599 A1 | 4/2018 | Yin | |
| 2018/0300557 A1 | 10/2018 | Rodenas et al. | |
| 2018/0307303 A1 | 10/2018 | Powderly et al. | |
| 2018/0322701 A1 | 11/2018 | Pahud et al. | |
| 2018/0335925 A1 | 11/2018 | Hsiao et al. | |
| 2018/0357780 A1 | 12/2018 | Young et al. | |
| 2019/0094981 A1 | 3/2019 | Bradski et al. | |
| 2019/0107894 A1 | 4/2019 | Hebbalaguppe et al. | |
| 2019/0213792 A1 | 7/2019 | Jakubzak et al. | |
| 2019/0258318 A1 | 8/2019 | Qin et al. | |
| 2019/0278376 A1 | 9/2019 | Kutliroff et al. | |
| 2019/0279424 A1 | 9/2019 | Clausen et al. | |
| 2019/0279426 A1* | 9/2019 | Musunuri | G06T 19/20 |
| 2019/0286231 A1 | 9/2019 | Burns et al. | |
| 2019/0362562 A1 | 11/2019 | Benson | |
| 2019/0369391 A1 | 12/2019 | Cordesses et al. | |
| 2019/0377416 A1 | 12/2019 | Alexander | |
| 2020/0082629 A1 | 3/2020 | Jones et al. | |
| 2020/0097091 A1 | 3/2020 | Chou et al. | |
| 2020/0218423 A1 | 7/2020 | Ohashi | |
| 2020/0225736 A1 | 7/2020 | Schwarz et al. | |
| 2020/0225758 A1 | 7/2020 | Tang et al. | |
| 2020/0226814 A1 | 7/2020 | Tang et al. | |
| 2020/0363930 A1 | 11/2020 | Srinivasan et al. | |
| 2021/0012113 A1* | 1/2021 | Petill | G06F 40/44 |

OTHER PUBLICATIONS

Hincapie-Ramos, J.D. et al. "GyroWand: IMU-based raycasting for augmented reality head-mounted displays." Proceedings of the 3rd ACM Symposium on Spatial User Interaction, Aug. 2015, pp. 89-98.

International Search Report and Written Opinion, PCT Patent Application PCT/US2020/051763, dated Feb. 3, 2021, 11 pages.

Mayer, S. et al. "The effect of offset correction and cursor on mid-air pointing in real and virtual environments." Proceedings of the 2018 CHI Conference on Human Factors in Computing Systems, Apr. 2018, pp. 1-13.

Olwal, A. et al. "The Flexible Pointer: An Interaction Technique for Selection in Augmented and Virtual Reality," Proceedings of ACM Symposium on User Interface Software and Technology (UIST), pp. 81-82, publication date Nov. 5, 2003.

Renner, P. et al. "Ray Casting". [accessed Apr. 7, 2020], 2 pages.

Schweigert, R. et al. "EyePointing: A gaze-based selection technique." Proceedings of Mensch and Computer, Sep. 8, 2019, pp. 719-723.

Invitation to Pay Additional Fees for International Application No. PCT/US2021/044098, dated Nov. 3, 2021, 15 pages.

* cited by examiner

Augment Object

Properties (502):
ID (506): 135643

Name (508): "Swimming"

Type (510): post

Parent_Augment (512): 139982

Display_Modes (514):
interactive (516) {
 context. sysetm_mode == 'interactive'
 placementTypes: vertical_surface, horizontal_surface
 shape: <shape object>
 content: <content items>
 isMoveable: true      }
glint (518) {
 context. sysetm_mode == 'active'
 placementTypes: headLocked_side_surface
 shape: <pre-defined glint shape object>
 content: <content items>
 isMoveable: false      }
vertical_display (520) {
 context: <extends 'interactive'> &&
           on_vertical_surface == true
 placementTypes: vertical_surface
 shape: <shape object>
 content: <content items>
 isMoveable: true      }

Location (524):

Current_Display_Mode (526):

Current_Dimensions (528):

Owner (530):

Functions (504):
addContent(content, offset, display_mode, manifestForSpawning) (532){...} removeContent(contentID) (534){...} setLocation(location, orientation) (536){...} setDisplayMode(modeID) (540){...} setOwner(ID) (542){...}

ARTIFICIAL REALITY AUGMENTS AND SURFACES

CROSS-REFERENCE TO RELATED APPLICATIONS

This application is related to U.S. patent application Ser. No. 17/008,478, titled "ARTIFICIAL REALITY AUGMENTS AND SURFACES," filed on Aug. 31, 2020, which is herein incorporated by reference in its entirety.

TECHNICAL FIELD

The present disclosure is directed to a new mode of artificial reality control and interaction, with augments as a fundamental object.

BACKGROUND

Interaction with computing systems are often founded on a set of core concepts that define how users can interact with that computing system. For example, early operating systems provided textual interfaces to interact with a file directory. This was later built upon with the addition of "windowing" systems whereby levels in the file directory and executing applications were displayed in multiple windows, each allocated a portion of a 2D display that was populated with content selected for that window (e.g., all the files from the same level in the directory, a graphical user interface generated by an application, menus or controls for the operating system, etc.). As computing form factors decreased in size and added integrated hardware capabilities (e.g., cameras, GPS, wireless antennas, etc.) the core concepts again evolved, moving to an "app" focus where each app encapsulated a capability of the computing system.

Existing artificial reality (XR) systems provide models, such as 3D virtual objects and 2D panels, with which a user can interact in 3D space. Existing XR systems have generally backed these models by extending the app core computing concept. For example, a user can instantiate these models by activating an app and telling the app to create the model, and using the model as an interface back to the app. This approach generally requires simulating in the virtual space the types of interactions traditionally performed with mobile devices and requires continued execution of the app for the models to persist in the artificial reality environment.

BRIEF DESCRIPTION OF THE DRAWINGS

FIG. 5 is a block diagram illustrating an example augment data structure used in some implementations of the present technology.

The techniques introduced here may be better understood by referring to the following Detailed Description in conjunction with the accompanying drawings, in which like reference numerals indicate identical or functionally similar elements.

DETAILED DESCRIPTION

Figure 1:
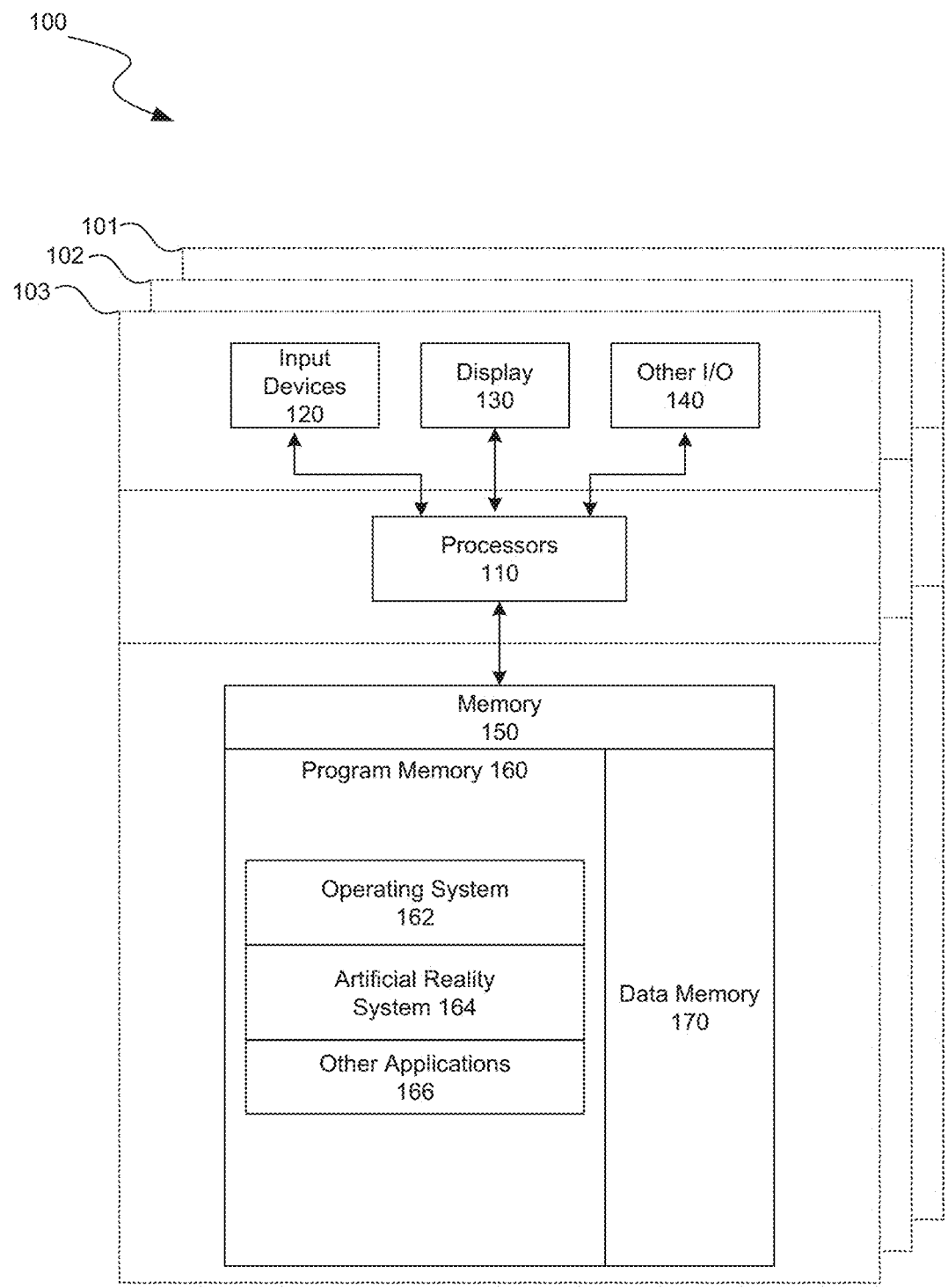
FIG. 1 is a block diagram illustrating an overview of devices on which some implementations of the present technology can operate.

Aspects of the present disclosure are directed to an artificial reality system that provides an artificial reality environment with augments and surfaces. An "augment,"

also referred to herein as a "virtual container" is a 2D or 3D volume, in an artificial reality environment, that can include presentation data, context, and logic. An artificial reality system can use augments as the fundamental building block for displaying 2D and 3D content in the artificial reality environment. For example, augments can represent people, places, and things in an artificial reality environment and can respond to a context such as a current display mode, date or time of day, a type of surface the augment is on, a relationship to other augments, etc. A controller in the artificial reality system, sometimes referred to as a "shell," can control how artificial reality environment information is surfaced to users, what interactions can be performed, and what interactions are provided to applications. Augments can live on "surfaces" with context properties and layouts that cause the augments to be presented or act in different ways. Augments and other objects (real or virtual) can also interact with each other, where these interactions can be mediated by the shell and are controlled by rules in the augments evaluated based on contextual information from the shell.

An augment can be created by requesting the augment from the artificial reality system shell, where the request supplies a manifest specifying initial properties of the augment. The manifest can specify parameters such as an augment title, a type for the augment, display properties (size, orientation, location, eligible location type, etc.) for the augment in different display modes or contexts, context factors the augment needs to be informed of to enable display modes or invoke logic, etc. The artificial reality system can supply the augment as a volume, with the properties specified in the manifest, for the requestor to place in the artificial reality environment and write presentation data into. Additional details on creating augments are provided below in relation to FIGS. 6A and 6B.

Augment "presentation data" can include anything that can be output by the augment, including visual presentation data, auditory presentation data, haptic presentation data, etc. In some implementations, the presentation data can be "live" such that it matches external data either by pointing to that external data or being a copy of it that is periodically updated. The presentation data can also be shared, such that a change to the external data by another user or system can be propagated to the output of the augment. For example, an augment can display live services and data while accepting interactions from users or other augments. As a more specific example, a user may select a photo shared on a social media platform to add as presentation data to an augment that is positioned on her wall. The owner of the post may modify the photo and the modified version can be shown in the augment. Additional live social media content related to the photo may also be in the augment presentation data, such as indications of "likes" or comments on the photo. The owner of the photo may also change the access rights, causing the photo to no longer display in the augment.

An augment can track a current context, based on context factors signaled to the augment by the artificial reality system. A context can include a variety of context factors such as a current mode of the artificial reality system (e.g., interactive mode, minimized mode, audio-only mode, etc.), other objects (real or virtual) in the artificial reality environment or within a threshold distance of an augment, characteristics of a current user, social graph elements related to the current user and/or artificial reality environment objects, artificial reality environment conditions (e.g., time, date, lighting, temperature, weather, graphical mapping data), surface properties, movement characteristics of the augment or of other objects, sounds, user commands, etc. As used herein an "object" can be a real or virtual object and can be an inanimate or animate object (e.g., a user). Context factors can be identified by the artificial reality system and signaled to the relevant augments. Some context factors (e.g., the current artificial reality system mode) can be automatically supplied to all augments. Other context factors can be registered to be delivered to certain augments (e.g., at creation time via the manifest or through a subsequent context factor registration call). The augment can have variables that hold context factors for which the augment has logic. All augments can inherit some of these variables from a base augment class, some of these variables can be defined in extensions of the augment class (e.g., for various pre-established augment types), or some of these variables can added to individual augments at augment creation (e.g., with the manifest) or through a later declaration. In some cases, certain context factors can be tracked by the artificial reality system, which augments can check without the artificial reality system having to push the data to individual augments. For example, the artificial reality system may maintain a time/date global variable which augments can access without the artificial reality system constantly pushing the value of that variable to the augment.

The augment's logic (defined declaratively or imperatively) can cause the augment to change its presentation data, properties, or perform other actions in response to context factors. Similarly to the variable holding context factors, the augment's logic can be specified in a base class, in an extension of the base class for augment types, or individually for the augment (e.g., in the manifest). For example, all augments can be defined to have logic to redraw themselves for different display modes, where the augment is provided different sizes or shapes of volumes to write into for the different modes. As a further example, all augments of a "person" type can have logic to provide notifications of posts by that person or incoming messages from that person. As yet another example, a specific augment can be configured with logic that responds to an area_type context factor for which the augment is registered to receive updates, where the augment responds to that context factor having an "outside" value by checking if a time context factor indicates between 6:00 am and 7:00 pm, and if so, switching to a darker display mode.

Additional details on augment structures, such as presentation data, properties, and functions are provided below in relation to FIGS. 5, 6A, and 6B. Additional details on providing context factors to augments and causing augments to invoke corresponding display modes and/or logic are provided below in relation to FIGS. 5 and 7.

In some implementations, augments exist independently of the augment that created them. Thus, when the parent augment closes, it does not necessarily close child augments. However, such hierarchical functionality could be performed, such as where the child augment is registered to receive a context factor for the status of the parent augment and has logic to close itself upon receiving a signal that the parent augment is closed.

Augments may be located in an artificial reality environment by being attached to a surface. A "surface" can be a point, 2D area, or 3D volume to which one or more augments can be attached. Surfaces can be world-locked or positioned relative to a user or other object. Surfaces can be defined by shape, position, and in some cases, orientation. In some implementations, surfaces can have specified types such as a point, a wall (e.g., a vertical 2D area), a floor or counter (e.g., a horizontal 2D area), a face, a volume, etc.

Surfaces can be created in various contexts, such as synthetic surfaces, semantic surfaces, or geometric surfaces.

Synthetic surfaces can be generated without using object recognition or room mapping. Examples of synthetic surfaces include a bubble (e.g., a body-locked surface positioned relative to the user as the user moves in the artificial reality environment, regardless of real-world objects); a surface attached to a device (e.g., the artificial reality system may include controllers, an external processing element, etc. that periodically update their position to the artificial reality system, allowing surfaces to be placed relative to the device); a floating surface (e.g., a world-locked surface with a location specified in relation to the position of the artificial reality system, but adjusted to appear fixed as movements of the artificial reality system are detected, thus not requiring understanding of the physical world, other than artificial reality system movement, to be positioned).

Semantic surfaces can be positioned based on recognized (real or virtual) objects, such as faces, hands, chairs, refrigerators, tables, etc. Semantic surfaces can be world-locked, adjusting their display in a field of view to be displayed with a constant relative position to the recognized objects. Semantic surfaces can be molded to fit the recognized object or can have other surface shapes positioned relative to the recognized object.

Geometric surfaces can map to structures in the world, such as portions of a wall or floor or can specify a single point in space. While in some instances geometric surfaces can be a type of semantic surface, in other cases, geometric surfaces can exist independent of ongoing object recognition as they are less likely to be repositioned. For example, portions of a wall can be mapped using a simultaneous localization and mapping ("SLAM") system. Such surfaces can then be used by the same or other artificial reality system systems by determining a position of the artificial reality system in the map, without having to actively determine other object locations. Examples of geometric surfaces can include points, 2D areas (e.g., portions of floors, counters, walls, doors, windows, etc.), or volumes relative to structures (e.g., cuboids, spheres, etc. positioned relative to the floor, a wall, the inside of a room, etc.)

In various implementations, surfaces can be created manually, semi-automatically, or automatically. Manual surface creation allows users to explicitly define surfaces, e.g., by tracing a portion of a wall, placing a hand or controller on a flat surface, indicating a central point and radius for a surface, etc. Automatic surface creation can include identifying objects with particular types (e.g., faces, tables) or with particular characteristics (e.g., flat surfaces of a threshold size, 2D surfaces with which the user has interacted a threshold amount, etc.). In some implementations, automatic surface creation can be aided by machine learning models trained to identify surfaces (e.g., using manually identified surfaces or user corrections to automatically identified surfaces as training data). Semi-automatic surface creation can include automatically detecting surfaces which are suggested to a user to verify and/or modify.

In some implementations, a surface can have a specified layout that controls where augments added to the surface can be placed. The layout assigned to a surface can be user-selected or automatically applied (e.g., based on a mapping of surface characteristics such as size and shape to layouts). Layouts can be static (specifying particular locations in the layout where augments can be placed) or dynamic (where slots for augments adjust according to the size, number, type, etc., of the augments placed on the surface). Examples of layouts include a list layout where augments are uniformly spaced in a horizontal line; a stack layout where augments are uniformly spaced in a vertical line; a grid layout that uses a defined grid for placing augments (which may be dynamic by specifying x, y, and/or z counts for the grid based on the number of augments on the surface); and a freeform layout where augments stay where they are originally placed.

Once a surface has been created, augments can be added to it. In some cases, augments can be automatically attached to a surface, e.g., by attaching an augment to a surface a user is focused on by creating an augment on the same surfaces as an augment that requested creation of the new augment. In other cases, an augment can have logic or display modes that specifies a surface or surface type to attach that augment to (e.g., response to various context factors). In other cases, augments can be manually attached to a surface, e.g., by the user selecting an augment and indicating to the artificial reality system to attach that augment to a surface. Augments can be manually placed in a particular slot in the layout of a surface or can be placed on the surface and allow the surface to place the augment in a layout slot (e.g., by selecting a next slot in an order defined for the layout slots, selecting a slot based on where on the surface the augment was placed, selecting a slot that best fits the augment, combining or resizing slots to accommodate the augment, etc.) When an augment is attached to a surface, corresponding context factors can be provided to the augment or other augments on the surface, such as properties of the surface (e.g., type, orientation, shape, size), count or details of other augments on the surface, layout location assigned to the augment, etc. Additional details on surface creation, layout configuration, and adding augments to surfaces are provided below in relation to FIG. 8.

In some implementations, augments can interact with each other e.g., by having defined logic that takes parameters of context factors defined by properties of other augments. Augments can register with the artificial reality system to receive context factors specifying properties of other augments (e.g., position, size, content defined by meta-data tags, etc.) In various implementations, augments can control which other augments have permissions to access various of the properties of that augment. In some cases, for an augment to register to receive properties of other augments, a particular relationship must exist between the augments, such as one augment being an ancestor of the other, the augments being attached to the same surface, or an explicit user interaction associating the augments (e.g., dragging one augment onto the other). In some implementations, the registrations of an augment to receive other augment properties are made with the artificial reality system, such that the artificial reality system mediates the sharing of properties by identifying changes in those context factors the augments are allowed to share and provides them. In other implementations, such registrations can be done with the augments, allowing the augments to pull/push properties to and from each other. Augments can have defined logic for reacting to the properties of other augments. In some implementations, this logic can be defined for the particular augment or can be defined for a type of augment. For example, all "people" augments can be defined to perform a particular action when placed near another person augment where a social graph defines a "friend" relationship between the people the augments are for. Additional details on interactions between augments are provided below in relation to FIG. 9.

Embodiments of the disclosed technology may include or be implemented in conjunction with an artificial reality system. Artificial reality or extra reality (XR) is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real world after they have passed through a computing system. For example, a tablet with a camera on the back can capture images of the real world and then display the images on the screen on the opposite side of the tablet from the camera. The tablet can process and adjust or "augment" the images as they pass through the system, such as by adding virtual objects. "Mixed reality" or "MR" refers to systems where light entering a user's eye is partially generated by a computing system and partially composes light reflected off objects in the real world. For example, a MR headset could be shaped as a pair of glasses with a pass-through display, which allows light from the real world to pass through a waveguide that simultaneously emits light from a projector in the MR headset, allowing the MR headset to present virtual objects intermixed with the real objects the user can see. "Artificial reality," "extra reality," or "XR," as used herein, refers to any of VR, AR, MR, or any combination or hybrid thereof.

Existing artificial reality systems provide app focused precepts for presenting and interacting with virtual objects. However, these artificial reality systems provide limited functionality, simply mimicking the traditional user experience of using "apps" and/or "windows" to oversee object presentation, functionality, placement, and interactions. By relying on app constructs designed for desktop computing and mobile device interactions, these existing systems remove the user experience from being focused on people and objects. For example, by requiring users to pull up a window or app interface to create and modify objects, users lose the perception of the virtual objects being real. Furthermore, existing systems' reliance on a central app to control all the 3D objects it creates wastes processing resources by constantly executing unnecessary aspects of the app beyond those needed solely to maintain the object. This can be especially wasteful when some of those objects are inactive. Such reliance on the originating app to maintain the objects also results in the objects disappearing if the app is closed, reducing flexibility and usability of the system. In addition, when an app is in control of objects, the object can only react to context factors the app is aware of. However, to maintain security, many systems may not provide context factor access to an app whose limits on sharing of those context factors cannot be guaranteed. It can also be computationally expensive to have apps as a second level of abstraction between the operating system and the objects, requiring coordination of providing context factors to an app for the app to then pass down to objects. In addition, existing systems fail to provide appropriate methods for organizing objects placed in an artificial reality environment and controlling which objects can interact with each other.

The artificial reality system and processes described herein that use augments as fundamental objects that exist separate from the entities that created them are expected to overcome these problems associated with conventional artificial reality systems. In particular, the artificial reality system and processes described herein are expected to remove layers of interactions with application controls, allowing more realistic interactions in an artificial reality environment by allowing users to treat virtual objects more like real-world objects. Further, the artificial reality system and processes are expected to preserve processing resources by having augments exist independently without having to maintain execution of the application that created them. Yet further, the artificial reality system and processes are expected to increase usability and flexibility by allowing individual augments to exist when the entity that created them closes. Also, these artificial reality system and processes are expected to provide greater security by directly controlling which augments receive context factors while also reducing overhead in coordinating context factor distribution by removing an extra layer of coordination. The artificial reality system and processes are also expected to provide greater usability by providing surface organization methods and security by controlling information dissemination by surface groupings.

In addition to providing these benefits in usability, flexibility, security, and preserving processing resources, the artificial reality system and processes described herein are rooted in computerized artificial reality systems, providing new core concepts specifically designed for object control and interaction in artificial reality environments. Furthermore, while the artificial reality system and processes described herein provide a user experience of interacting with virtual objects in a manner similar to real objects, the disclosed systems and processes are implemented with specialized data structures and interactions rules that are not analogs to either traditional computing interactions or interactions with real objects.

Several implementations are discussed below in more detail in reference to the figures. FIG. 1 is a block diagram illustrating an overview of devices on which some implementations of the disclosed technology can operate. The devices can comprise hardware components of a computing system 100 that provides an artificial reality environment with augments and surfaces. In various implementations, computing system 100 can include a single computing device 103 or multiple computing devices (e.g., computing device 101, computing device 102, and computing device 103) that communicate over wired or wireless channels to distribute processing and share input data. In some implementations, computing system 100 can include a stand-alone headset capable of providing a computer created or augmented experience for a user without the need for external processing or sensors. In other implementations, computing system 100 can include multiple computing devices such as a headset and a core processing component (such as a console, mobile device, or server system) where some processing operations are performed on the headset and others are offloaded to the core processing component. Example headsets are described below in relation to FIGS. 2A and 2B. In some implementations, position and environment data can be gathered only by sensors incorporated in the headset device, while in other implementations one or more of the non-headset computing devices can include sensor components that can track environment or position data.

Computing system 100 can include one or more processor (s) 110 (e.g., central processing units (CPUs), graphical processing units (GPUs), holographic processing units (HPUs), etc.) Processors 110 can be a single processing unit or multiple processing units in a device or distributed across multiple devices (e.g., distributed across two or more of computing devices 101-103).

Computing system 100 can include one or more input devices 120 that provide input to the processors 110, notifying them of actions. The actions can be mediated by a hardware controller that interprets the signals received from the input device and communicates the information to the processors 110 using a communication protocol. Each input device 120 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, or other user input devices.

Processors 110 can be coupled to other hardware devices, for example, with the use of an internal or external bus, such as a PCI bus, SCSI bus, or wireless connection. The processors 110 can communicate with a hardware controller for devices, such as for a display 130. Display 130 can be used to display text and graphics. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network chip or card, video chip or card, audio chip or card, USB, firewire or other external device, camera, printer, speakers, CD-ROM drive, DVD drive, disk drive, etc.

Computing system 100 can include a communication device capable of communicating wirelessly or wire-based with other local computing devices or a network node. The communication device can communicate with another device or a server through a network using, for example, TCP/IP protocols. Computing system 100 can utilize the communication device to distribute operations across multiple network devices.

The processors 110 can have access to a memory 150, which can be contained on one of the computing devices of computing system 100 or can be distributed across of the multiple computing devices of computing system 100 or other external devices. A memory includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, artificial reality system 164, and other application programs 166. Memory 150 can also include data memory 170 that can include augment data structures, surface data structures, augment context factor registrations, artificial reality environment information, other augment and/or surface support data, social graph data, configuration data, settings, user options or preferences, etc., which can be provided to the program memory 160 or any element of the computing system 100.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2A:
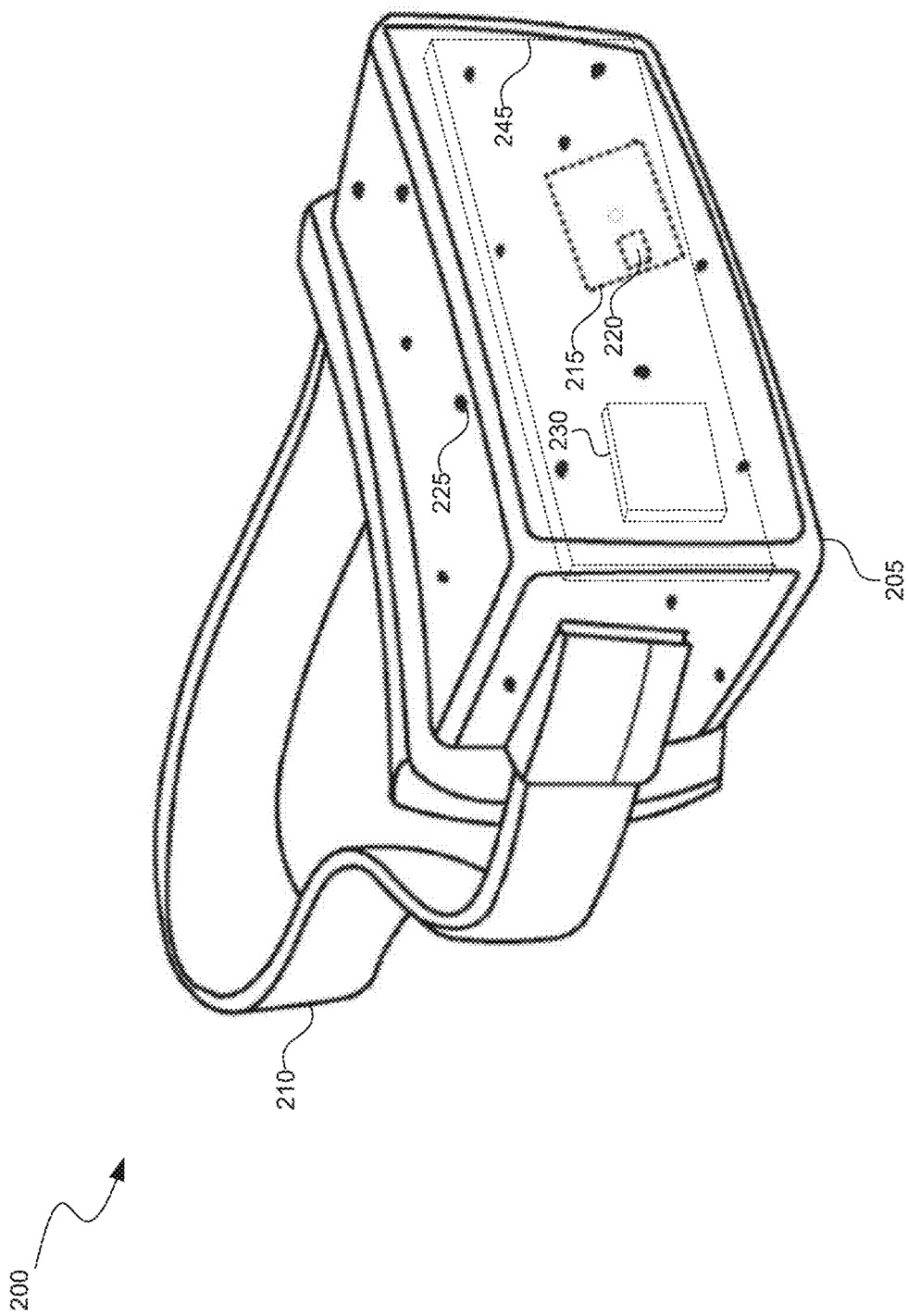
FIG. 2A is a wire diagram illustrating a virtual reality headset which can be used in some implementations of the present technology.

FIG. 2A is a wire diagram of a virtual reality head-mounted display (HMD) 200, in accordance with some embodiments. The HMD 200 includes a front rigid body 205 and a band 210. The front rigid body 205 includes one or more electronic display elements of an electronic display 245, an inertial motion unit (IMU) 215, one or more position sensors 220, locators 225, and one or more compute units 230. The position sensors 220, the IMU 215, and compute units 230 may be internal to the HMD 200 and may not be visible to the user. In various implementations, the IMU 215, position sensors 220, and locators 225 can track movement and location of the HMD 200 in the real world and in a virtual environment in three degrees of freedom (3DoF) or six degrees of freedom (6DoF). For example, the locators 225 can emit infrared light beams which create light points on real objects around the HMD 200. One or more cameras (not shown) integrated with the HMD 200 can detect the light points. Compute units 230 in the HMD 200 can use the detected light points to extrapolate position and movement of the HMD 200 as well as to identify the shape and position of the real objects surrounding the HMD 200.

The electronic display 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof.

In some implementations, the HMD 200 can be coupled to a core processing component such as a personal computer (PC) (not shown) and/or one or more external sensors (not shown). The external sensors can monitor the HMD 200 (e.g., via light emitted from the HMD 200) which the PC can use, in combination with output from the IMU 215 and position sensors 220, to determine the location and movement of the HMD 200.

In some implementations, the HMD 200 can be in communication with one or more other external devices, such as controllers (not shown) which a user can hold in one or both hands. The controllers can have their own IMU units, position sensors, and/or can emit further light points. The HMD 200 or external sensors can track these controller light points. The compute units 230 in the HMD 200 or the core processing component can use this tracking, in combination with IMU and position output, to monitor hand positions and motions of the user. The controllers can also include various buttons a user can actuate to provide input and interact with virtual objects. In various implementations, the HMD 200 can also include additional subsystems, such as an eye tracking unit, an audio system, various network components, etc. In some implementations, instead of or in addition to controllers, one or more cameras included in the HMD 200 or external to it can monitor the positions and poses of the user's hands to determine gestures and other hand and body motions.

Figure 2B:
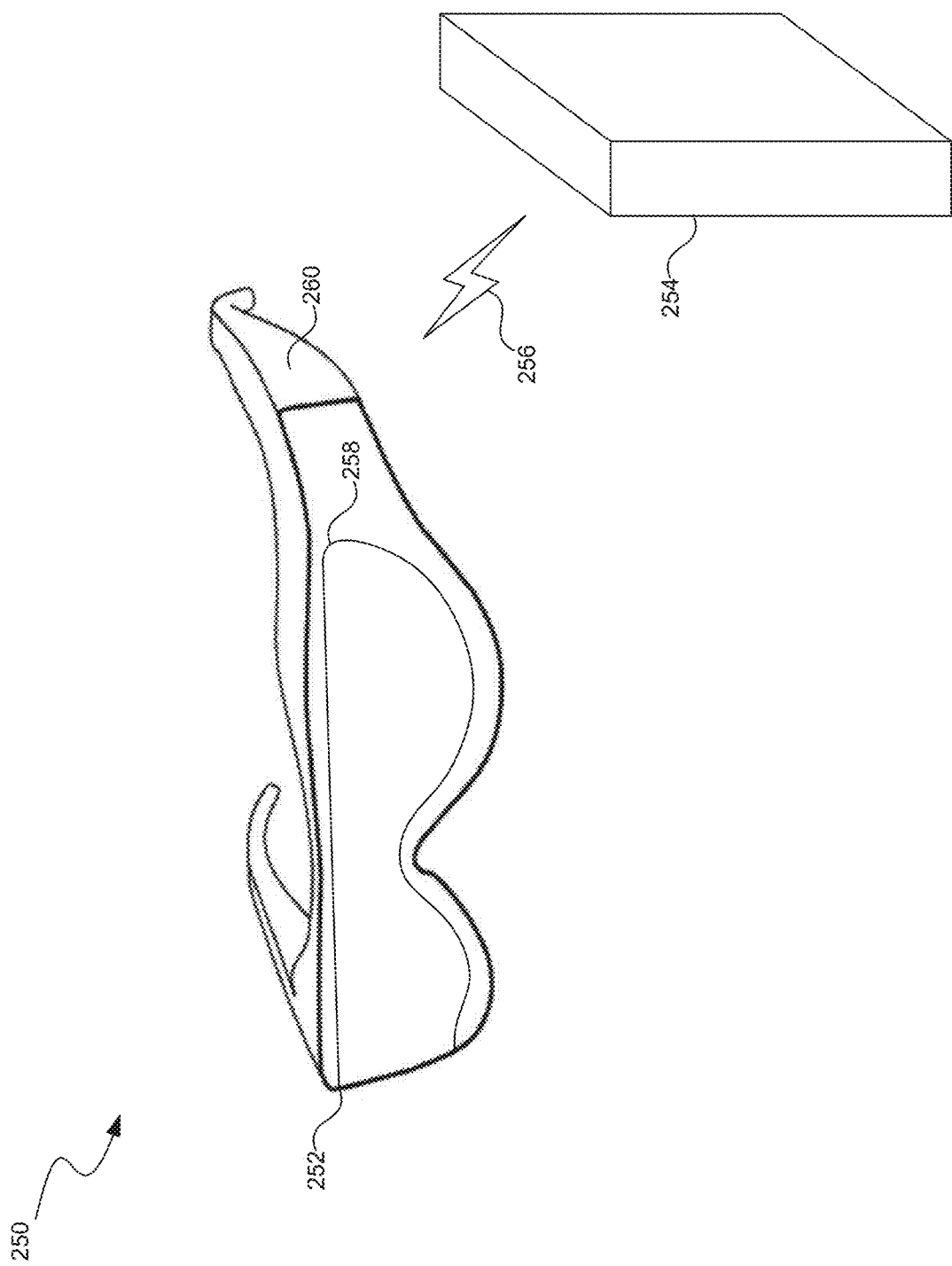
FIG. 2B is a wire diagram illustrating a mixed reality headset which can be used in some implementations of the present technology.

FIG. 2B is a wire diagram of a mixed reality HMD system 250 which includes a mixed reality HMD 252 and a core processing component 254. The mixed reality HMD 252 and the core processing component 254 can communicate via a wireless connection (e.g., a 60 GHz link) as indicated by link 256. In other implementations, the mixed reality system 250 includes a headset only, without an external compute device or includes other wired or wireless connections between the mixed reality HMD 252 and the core processing component 254. The mixed reality HMD 252 includes a pass-through display 258 and a frame 260. The frame 260 can house various electronic components (not shown) such as light projectors (e.g., LASERs, LEDs, etc.), cameras, eye-tracking sensors, MEMS components, networking components, etc.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to HMD 252. Controllers in the HMD 252 can convert the image data into light pulses from the projectors, which can be transmitted via the optical elements as output light to the user's eye. The output light can mix with light that passes through the display 258, allowing the output light to present virtual objects that appear as if they exist in the real world.

Similarly to the HMD 200, the HMD system 250 can also include motion and position tracking units, cameras, light sources, etc., which allow the HMD system 250 to, e.g., track itself in 3DoF or 6DoF, track portions of the user (e.g., hands, feet, head, or other body parts), map virtual objects to appear as stationary as the HMD 252 moves, and have virtual objects react to gestures and other real-world objects.

Figure 3:
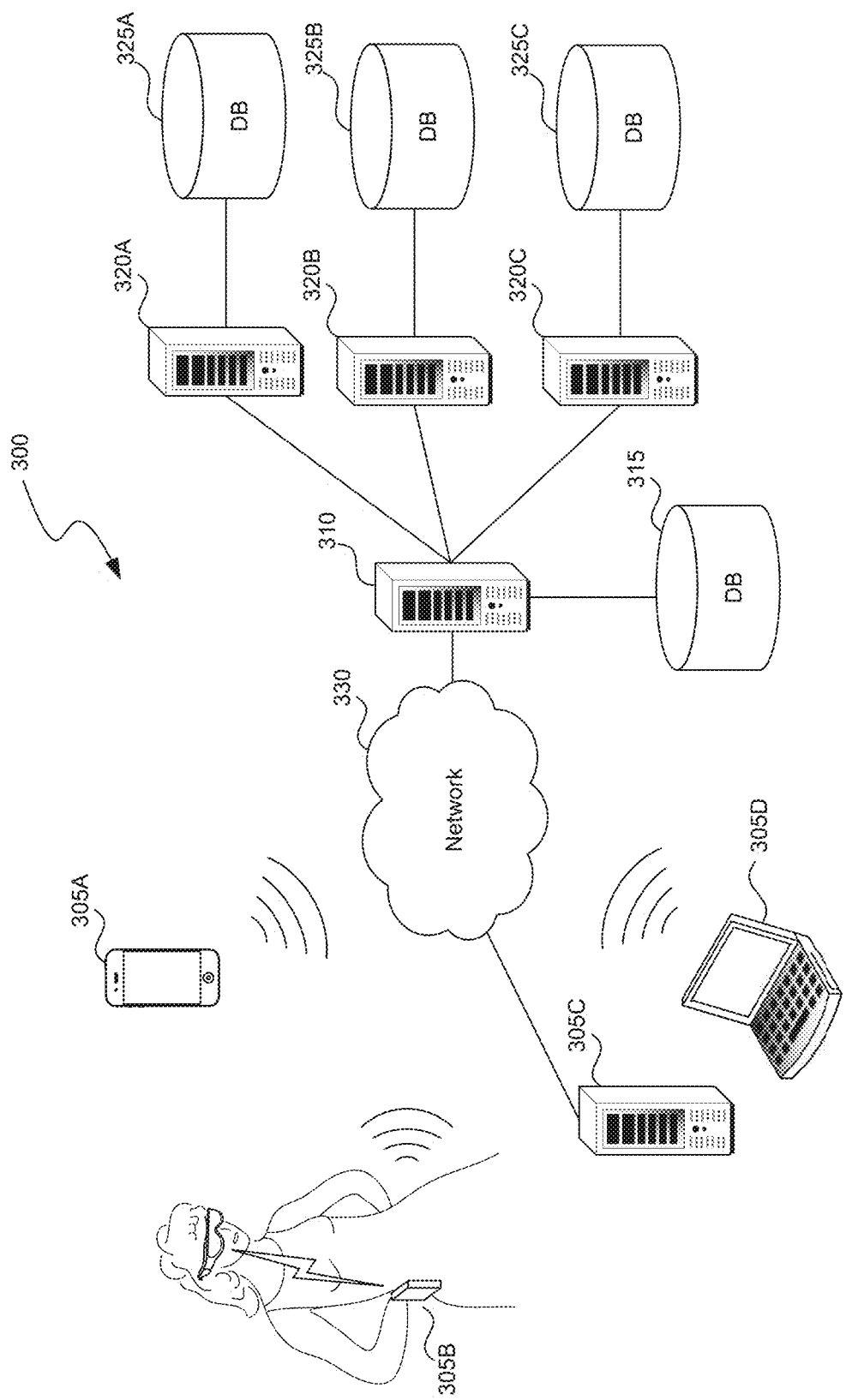
FIG. 3 is a block diagram illustrating an overview of an environment in which some implementations of the present technology can operate.

FIG. 3 is a block diagram illustrating an overview of an environment 300 in which some implementations of the disclosed technology can operate. Environment 300 can include one or more client computing devices 305A-D, examples of which can include computing system 100. In some implementations, some of the client computing devices (e.g., client computing device 305B) can be the HMD 200 or the HMD system 250. Client computing devices 305 can operate in a networked environment using logical connections through network 330 to one or more remote computers, such as a server computing device.

In some implementations, server 310 can be an edge server which receives client requests and coordinates fulfillment of those requests through other servers, such as servers 320A-C. Server computing devices 310 and 320 can comprise computing systems, such as computing system 100. Though each server computing device 310 and 320 is displayed logically as a single server, server computing devices can each be a distributed computing environment encompassing multiple computing devices located at the same or at geographically disparate physical locations.

Client computing devices 305 and server computing devices 310 and 320 can each act as a server or client to other server/client device(s). Server 310 can connect to a database 315. Servers 320A-C can each connect to a corresponding database 325A-C. As discussed above, each server 310 or 320 can correspond to a group of servers, and each of these servers can share a database or can have their own database. Though databases 315 and 325 are displayed logically as single units, databases 315 and 325 can each be a distributed computing environment encompassing multiple computing devices, can be located within their corresponding server, or can be located at the same or at geographically disparate physical locations.

Network 330 can be a local area network (LAN), a wide area network (WAN), a mesh network, a hybrid network, or other wired or wireless networks. Network 330 may be the Internet or some other public or private network. Client computing devices 305 can be connected to network 330 through a network interface, such as by wired or wireless communication. While the connections between server 310 and servers 320 are shown as separate connections, these connections can be any kind of local, wide area, wired, or wireless network, including network 330 or a separate public or private network.

In some implementations, one or more of servers 310 and/or 320 can be used as part of a social network. The social network can maintain a social graph and provide aspects of it to the artificial reality system, which can perform various actions based on the social graph. A social graph can include a set of nodes (representing social networking system objects, also known as social objects) interconnected by edges (representing interactions, activity, or relatedness). A social networking system object can be a social networking system user, nonperson entity, content item, group, social networking system page, location, application, subject, concept representation or other social networking system object, e.g., a movie, a band, a book, etc. Content items can be any digital data such as text, images, audio, video, links, webpages, 3D or 2D model, minutia (e.g., indicia provided from a client device such as emotion indicators, status text snippets, location indictors, etc.), or other multi-media. In various implementations, content items can be social network items or parts of social network items, such as posts, likes, mentions, news items, events, shares, comments, messages, other notifications, etc. Subjects and concepts, in the context of a social graph, comprise nodes that represent any person, place, thing, or idea.

A social networking system can enable a user to enter and display information related to the user's interests, age/date of birth, location (e.g., longitude/latitude, country, region, city, etc.), education information, life stage, relationship status, name, a model of devices typically used, languages identified as ones the user is facile with, occupation, contact information, or other demographic or biographical information in the user's profile. Any such information can be represented, in various implementations, by a node or edge between nodes in the social graph. A social networking system can enable a user to upload or create pictures, videos, documents, songs, 3D objects, or other content items, and can enable a user to create and schedule events. Content items can be represented, in various implementations, by a node or edge between nodes in the social graph.

A social networking system can enable a user to perform uploads or create content items, interact with content items or other users, express an interest or opinion, or perform other actions. A social networking system can provide various means to interact with non-user objects within the social networking system. Actions can be represented, in various implementations, by a node or edge between nodes in the social graph. For example, a user can form or join groups, or become a fan of a page or entity within the social networking system. In addition, a user can create, download, view, upload, link to, tag, edit, or play a social networking system object. A user can interact with social networking system objects outside of the context of the social networking system. For example, an article on a news web site might have a "like" button that users can click. In each of these instances, the interaction between the user and the object can be represented by an edge in the social graph connecting the node of the user to the node of the object. As another example, a user can use location detection functionality (such as a GPS receiver on a mobile device) to "check in" to a particular location, and an edge can connect the user's node with the location's node in the social graph.

A social networking system can provide a variety of communication channels to users. For example, a social networking system can enable a user to email, instant message, communicate in an artificial reality environment, send text/SMS message, etc., with one or more other users. It can enable a user to post a message to the user's wall or profile or another users wall or profile or interact with virtual objects created by or that exist in the artificial reality environment of another user. It can enable a user to post a message to a group or a fan page. It can enable a user to comment on an image, wall post or other content item created or uploaded by the user or another user. And it can allow users to interact (via their personalized avatar) with objects or other avatars in an artificial reality environment, etc. In some embodiments, a user can post a status message to the user's profile indicating a current event, state of mind, thought, feeling, activity, or any other present-time relevant communication. A social networking system can enable users to communicate both within, and external to, the social networking system. For example, a first user can send a second user a message within the social networking system, an email through the social networking system, an email external to but originating from the social networking system, an instant message within the social networking system, an instant message external to but originating from the social networking system, provide voice or video messaging between users, or provide a virtual environment were users can communicate and interact via avatars or other digital representations of themselves. Further, a first user can comment on the profile page of a second user, or can comment on objects associated with a second user, e.g., content items uploaded by the second user.

Social networking systems enable users to associate themselves and establish connections with other users of the social networking system. When two users (e.g., social graph nodes) explicitly establish a social connection in the social networking system, they become "friends" (or, "connections") within the context of the social networking system. For example, a friend request from a "John Doe" to a "Jane Smith," which is accepted by "Jane Smith," is a social connection. The social connection can be an edge in the social graph. Being friends or being within a threshold number of friend edges on the social graph can allow users access to more information about each other than would otherwise be available to unconnected users. For example, being friends can allow a user to view another user's profile, to see another user's friends, or to view pictures of another user. Likewise, becoming friends within a social networking system can allow a user greater access to communicate with another user, e.g., by email (internal and external to the social networking system), instant message, text message, phone, or any other communicative interface. Being friends can allow a user access to view, comment on, download, endorse or otherwise interact with another user's uploaded content items. Establishing connections, accessing user information, communicating, and interacting within the context of the social networking system can be represented by an edge between the nodes representing two social networking system users.

In addition to explicitly establishing a connection in the social networking system, users with common characteristics can be considered connected (such as a soft or implicit connection) for the purposes of determining social context for use in determining the topic of communications. In some embodiments, users who belong to a common network are considered connected. For example, users who attend a common school, work for a common company, or belong to a common social networking system group can be considered connected. In some embodiments, users with common biographical characteristics are considered connected. For example, the geographic region users were born in or live in, the age of users, the gender of users and the relationship status of users can be used to determine whether users are connected. In some embodiments, users with common interests are considered connected. For example, users' movie preferences, music preferences, political views, religious views, or any other interest can be used to determine whether users are connected. In some embodiments, users who have taken a common action within the social networking system are considered connected. For example, users who endorse or recommend a common object, who comment on a common content item, or who RSVP to a common event can be considered connected. A social networking system can utilize a social graph to determine users who are connected with or are similar to a particular user in order to determine or evaluate the social context between the users. The social networking system can utilize such social context and common attributes to facilitate content distribution systems and content caching systems to predictably select content items for caching in cache appliances associated with specific social network accounts.

Figure 4:
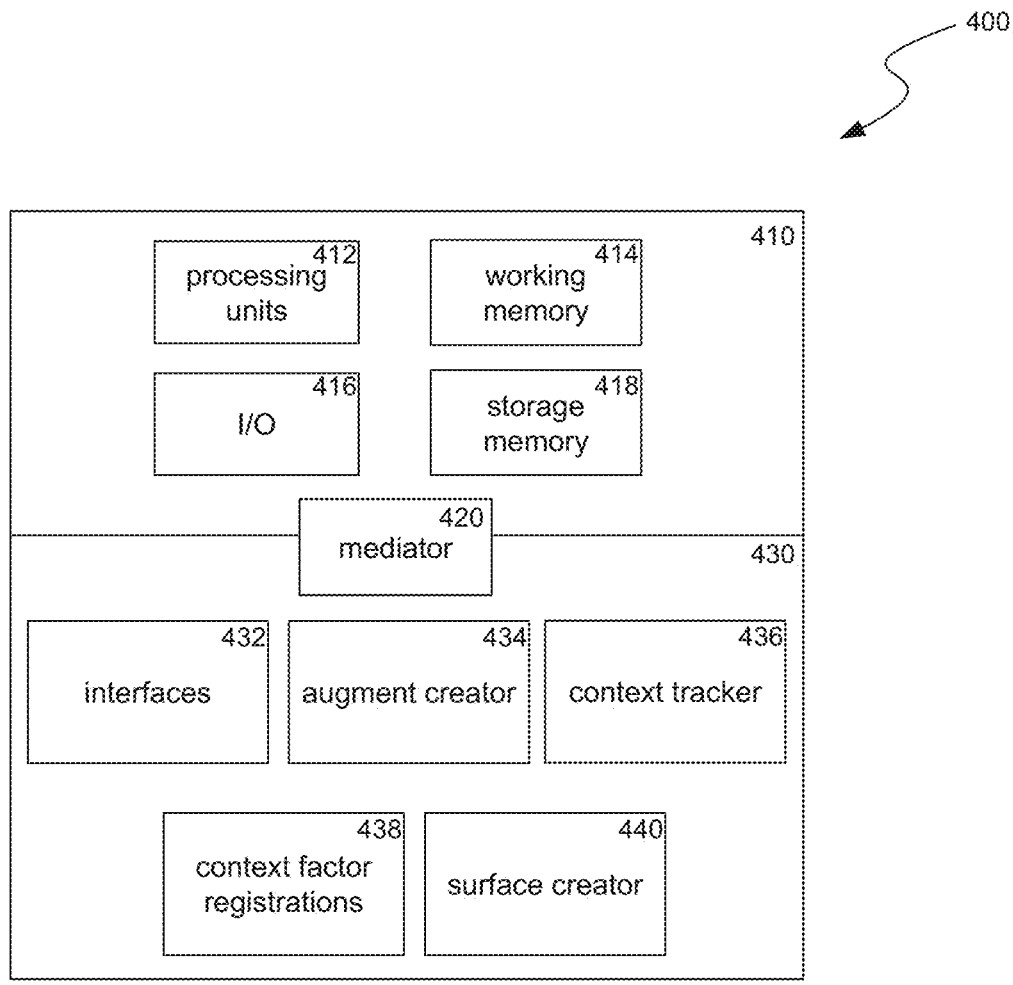
FIG. 4 is a block diagram illustrating components which, in some implementations, can be used in a system employing the disclosed technology.

FIG. 4 is a block diagram illustrating components 400 which, in some implementations, can be used in a system employing the disclosed technology. Components 400 can be included in one device of computing system 100 or can be distributed across multiple of the devices of computing system 100. The components 400 include hardware 410, mediator 420, and specialized components 430. As discussed above, a system implementing the disclosed technology can use various hardware including processing units 412, working memory 414, input and output devices 416 (e.g., cameras, displays, IMU units, network connections, etc.), and storage memory 418. In various implementations, storage memory 418 can be one or more of: local devices, interfaces to remote storage devices, or combinations thereof. For example, storage memory 418 can be one or more hard drives or flash drives accessible through a system bus or can be a cloud storage provider (such as in storage 315 or 325) or other network storage accessible via one or more communications networks. In various implementations, components 400 can be implemented in a client computing device such as client computing devices 305 or on a server computing device, such as server computing device 310 or 320.

Mediator 420 can include components which mediate resources between hardware 410 and specialized components 430. For example, mediator 420 can include an operating system, services, drivers, a basic input output system (BIOS), controller circuits, or other hardware or software systems.

Specialized components 430 can include software or hardware configured to perform operations for creating and managing augments and surfaces in an artificial reality environment. Specialized components 430 can include augment creator 432, context tracker 434, context factor registrations 438, surface creator 440, and components and APIs which can be used for providing user interfaces, transferring data, and controlling the specialized components, such as interfaces 432. In some implementations, components 400 can be in a computing system that is distributed across multiple computing devices or can be an interface to a server-based application executing one or more of specialized components 430. Although depicted as separate components, specialized components 430 may be logical or other nonphysical differentiations of functions and/or may be submodules or code-blocks of one or more applications.

Augment creator 432 can receive new augment requests, associated with a manifest, which it can use to create a new augment data structure. Additional details on augment data structures are provided below in relation to FIG. 5. Augment creator 432 can provide a handle to the augment data structure back to the requestor, allowing the requestor to fill the augment with content items, place it in an artificial reality environment, set parameters, etc. In some implementations, a handle to the augment data structure can be provided to the requestor prior to the augment being fully initialized, allowing concurrent initial augment manipulation (e.g., filling and/or placement) by the requestor while the artificial reality system completes augment initialization. For example, while the requestor manipulates the augment, augment creator 432 can complete initialization, e.g., by registering the augment to receive context factors that logic and/or display modes of the augment need to determine whether to execute logic or enable a display mode. Additional details on an artificial reality system creating an augment and allowing the requestor to manipulate the augment are provided below in relation to FIGS. 6A and 6B.

Context tracker 434 can track a set of factors that define a context in the artificial reality environment. Examples of such context factors include a current artificial reality system mode, lighting, positions of augments in the artificial reality environment, positions of real-world objects in the artificial reality environment, time, date, user interactions, detected sounds, etc. In some implementations, context tracker 434 can identify when a context factor is set or changes by a threshold amount and can provide those context factors to relevant augments.

In some cases, context tracker 434 provides the context factors to augments based on the augments having registered to receive those context factors, e.g., during augment creation or later through a registration call by the augment to the artificial reality system. Additional details on augment creation including registering for context factor signals and providing context factor notifications to augments are provided below in relation to FIGS. 6A and 7. In other cases, an augment can be selected to receive context factors in response to the augment being placed on surface. For example, properties of the surface or of other augments or real-world objects on the surface can be provided to the augment. Additional details on providing context factors to an augment based on surface affiliation are provided below in relation to FIG. 8. In yet further cases, relationships between augments can be specified where events related to the relationship can cause one or more of the augments to receive context factors. For example, a relationship can be established when an augment is moved to touch another augment, when an augment has logic or display modes that are conditional on properties of another augment, or in response to a command issued for multiple augments. Additional details on providing context factors to an augment based on events related to specified relationships between augments are provided below in relation to FIG. 9. In any of these cases where an augment is provided context factors or other properties, the augment can use the values for the context factors to evaluate conditions for invoking logic or enabling a display mode. For example, a display mode can have a condition that evaluates to true when a context factor for the artificial reality system state indicates "audio-only mode," which causes the augment to enter a display mode where nothing is shown by the augment and the only audio presentation data is output. Additional details on invoking logic and/or display modes based on received context factors are provided below in relation to blocks 708 of FIG. 7, 808 of FIG. 8, and 906 of FIG. 9.

Context factor registrations 438 can store mappings between augments and context factors, specifying which augments receive context factor signals when the context factors are set or change. As discussed above, these mappings can be set based on registrations by the augment, the augment being placed on a surface, or an identification of a relationship between augments. Additional details on registering augments to receive context factors are provided below in relation to blocks 606 of FIG. 6A, 806 of FIG. 8, and 902 of FIG. 9.

Surface creator 440 can create surfaces for use in an artificial reality environment. In various implementations, the surfaces can be (i) synthetic (generated automatically by the artificial reality system without regard to the environment, e.g., not world-locked), (ii) semantic (detected by machine learning recognizers, e.g., hands, faces, table, or other particular objects, etc.), or (iii) geometric (identified geometries in the environment e.g., floors, walls, etc.) Thus, surface creator 440 can define surfaces relative to the artificial reality system position, can identify surface geometries or object types specified for creating a surface, or can create surfaces relative to a user input (e.g., in response to a user performing an air tap, outlining a surface with a gesture, putting a hand, controller, or other peripheral device on the surface, defining a plane in the air with her hand to be used as a surface, attaching a surface to an object related to detected user interaction, etc.) Additional details on surface creation are provided below in relation to FIG. 8.

FIG. 5 is a block diagram illustrating an example of augment data structure 500. An augment is a volume in 3D space that can be filled with content or can otherwise output presentation data. Augments can hold data, respond to a current augment context, and have logic. An augment is created by sending a request to an artificial reality system shell with an augment manifest. The manifest can specify basic properties of the augment such as types of surfaces or locations where the augment can be placed, and how the augment will display itself in different modes, initial location, size, and orientation, etc. In some implementations, an augment can have a specific pre-defined type (e.g., person, 2D media, post, event, or 3D model), and the manifest will have defaults for that type (e.g., layout, content). The shell creates an augment based on the manifest and provides a handle to it back to the requester. The requester can then write content into the augment (including writing different versions for different display properties specified in the manifest). The shell can maintain control of where the augment can be displayed and which display properties are invoked, according to allowed positions and display properties specified in the manifest. For example, if the artificial realty system goes in to do-not-disturb mode, all augments can be put in minimized mode and moved out of the user's center of vision. Augments can be instantiated by the shell or another augment, but then can live on its own, independent of the requestor.

Augment data structure 500 includes properties 502 and functions ("logic") 504. Each of the items listed in augment properties 502 and functions 504 are examples of items that can be included in an augment data structure; in various implementations, more, less, or other properties and functions can be included in an augment data structure. In addition, the augment data structure can include properties and logic defined in a different manner than is shown in FIG. 5. For example, instead of or in addition to imperatively defined functions, augment logic can include declarative logic.

In example 500, properties 502 include an augment ID 506, an augment name 508, an augment type 510, a parent_augment 512, display_modes 514, a current location 524, a current_display_mode 526, current_dimensions 528, and owner 530.

Augment ID 506 can be set, when the augment is created, to a next available ID. Augment name 508, augment type 510, and display_modes 514 can be specified in a manifest for the augment provided in the initial request for the augment. The augment name 508 can be set to a string of characters. The augment type 510 can be set to one of a pre-defined set of available types, such as person, 2D media, post, event, 3D model, freeform, etc. In some implementations, the augment type can control a class of the augment, causing the augment to include properties and/or logic defined for that augment type. In some cases, these properties can be automatically set by selecting data corresponding to that type and parameters set in the augment manifest. For example, an augment manifest can specify the augment type is a "person" and a person ID of 488923. Upon receiving this request, the artificial reality system can create an instance of the person augment class with pre-set display_modes by executing a constructor function that pulls, from a social graph, data related to a node with a person ID 488923, such as an avatar or profile picture and default UI elements such as an instant message control. The resulting person augment can also include pre-defined person logic, such as a function to send an IM to the person of that augment when the instant message UI control is activated or a function to tag the person of that augment in a post when that augment is positioned to touch an augment with a post type.

Augment display modes 514 can include display modes defined in the augment manifest, in default display modes, or in type-specific display modes. Display modes can specify a condition in which that display mode is activated. In some cases, the condition can specify values that certain context factors must have, e.g., using logic operators such as AND, OR, NOT, EQUAL_TO, LESS_THAN, GREATER_THAN, etc. Display modes can also specify features that a surface must have for the augment to be added to that surface in that display mode, such as whether the surface is vertical or horizontal or a type of object the surface is associated with (e.g., a table, hands, face, etc.) Display modes can specify the shape (e.g., contours and size) of the augment when in that display mode. The display mode can include a content variable that stores the presentation data for the augment when in that mode. For example, each content item added to an augment can specify in which display modes (or sets of display modes) that content item is output as presentation data and how it is displayed in that mode, e.g., offset from an origin point of the augment, orientation, size, shape, volume, etc. Display modes can also specify whether the augment is moveable when in that display mode. Display modes can include many other properties, not shown here, defining how the augment is output when the condition for that display mode is true.

In some implementations, all augments can have a default set of display modes, such as display modes corresponding to artificial reality system modes (e.g., an audio only mode, a minimized or "glint" mode where augments are reduced to a maximum size, an active mode where augments are moved to the side of the user's field of view, or an interactive mode where augments can use their full size and be positioned anywhere in the artificial reality environment. These display modes can be inherited from a base augment class. In some implementations, augments of particular types can have display modes defined for those types, e.g., inherited from one of the augment type classes that extends the base augment class. Further display modes can be supplied in the manifest provided when the augment is requested. In some implementations, display modes from augment types can extend the default augment display modes. In some cases, display modes from the manifest can extend display modes from the default augment display modes or the augment type display modes. Extending a display mode can set additional condition factors for the extended display mode to occur and/or additional characteristics to use in configuring output of the augment. For example, interactive display mode 516 is enabled when the artificial reality system mode context factor indicates an "interactive" display mode, which sets the augment to be able to be put on vertical or horizontal surfaces and sets a shape for the augment. The vertical_display mode 520 extends the interactive display mode 516, meaning a prerequisite for enabling the vertical_display mode 520 is that the condition for the interactive display mode 516 is also true. When the vertical_display mode is enabled, the display properties for the interactive mode are enabled while the vertical_display mode further limits the augment to only vertical surfaces and sets a further shape for the augment (which cannot exceed the shape defined by the interactive display mode 516). As this example demonstrates, a display mode that is extended by another display mode can set constraints on display mode parameters (such as the shape object, the surface the augment is on, or whether the augment is moveable) that the extending display mode cannot alter or cannot exceed.

In some implementations, when an augment is created, the artificial reality system can review the context factors used in each of the display modes to determine which context factor changes to register the augment to receive. Additional details on registering an augment for context factors are provided below in relation to FIG. 6A.

Augment ID 506 can be set to a next available ID when the augment is created. A parent_augment 512 can be set to the ID of the element that requested creation of the new augment. Current_display_mode 526 can indicate which of the display modes 514 the augment is currently using. This can be initially set to a default display mode, a particular (e.g., first) display mode provided in the augment manifest, or whatever display mode matches current context factors. Current_dimensions 528 can be set based on the shape specified in the current display mode. Owner 530 can initially be set to the entity that requested the augment or to an entity specified in augment request. In some implementations, ownership of the augment can later be change by changing the entity (or entities) indicated by the owner 530 variable and ownership can confer certain rights (e.g., to set certain augment properties and/or to certain invoke augment logic). In some implementations, other permissions can be set on augment properties and/or functions specifying which entities have permissions to read/write/execute them. In some implementations, the artificial reality system maintains a hierarchy of augments based on which augments created other augments and/or which augments are owners of other augments, with a root of the hierarchy being the shell. When an augment is closed that is an owner of another augment, that ownership can be passed to the owner of the closed augment.

Current location 524 can be initially set to an initial location set in the manifest, to default location (e.g., attached to a surface defined by the requesting user's hand, allowing the user to further place the augment), to a location indicated when the new augment request was made (e.g., to a spot that is the focus of the user at that time or a location relative to the location of the requesting augment), or can be initially unset (causing the augment to be hidden) until the requestor sets a location. Depending on whether the augment display mode allows the augment to be repositioned ("isMoveable") the current location of the augment may be changeable.

In example 500, functions 504 include a function 532 for adding content to the augment, a function 534 for removing content from the augment, a function 536 for setting a location of the augment, a function 540 for setting the current display mode, and a function 542 for updating the augment owner.

In example 500, the addContent function takes a manifestForSpawning parameter. When this parameter is provided, the content added to the augment can be actionable to spawn a new augment, e.g., a user reaching into the augment and pulling out the spawnable content item initiates a request for a new augment. The manifest set in the manifestForSpawning parameter for that spawnable content item is then used in the request for the new augment. In some implementations, where a content item can spawn a new augment, it can be given a particular visual affordance indicating to the user it can be selected to create a new augment (e.g., particular highlighting, coloring, an animation, etc.) As with the properties 502, an augment can have other logic elements (not shown) for setting or getting augment properties or otherwise causing augment actions. Also similarly to properties 502, augment functions or other logic can be specified in the augment manifest, as logic specified in the augment class for the augment type, or specified in the base augment class.

Those skilled in the art will appreciate that the components illustrated in FIGS. 1-4 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 6A:
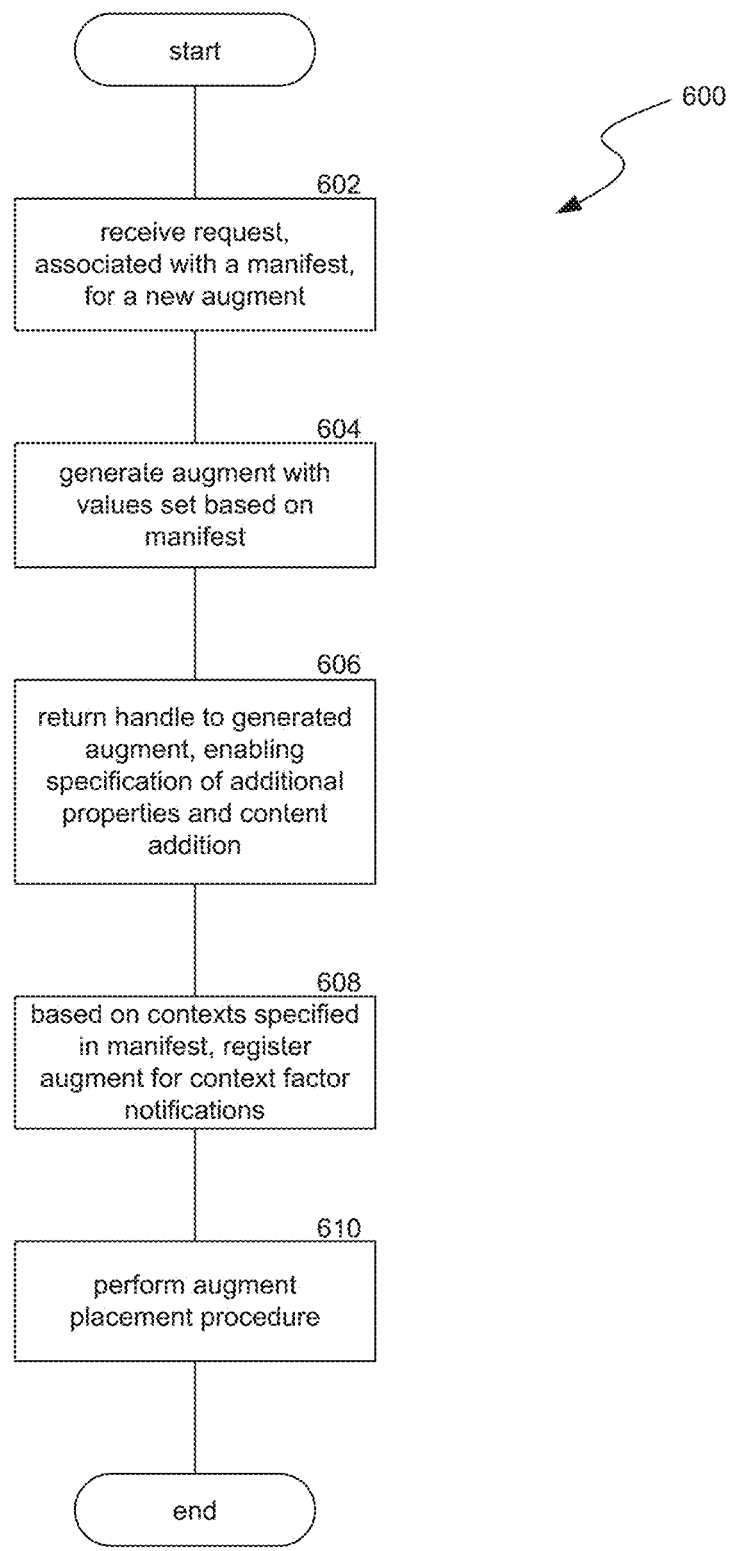
FIG. 6A is a flow diagram illustrating a process used in some implementations of the present technology for a shell to respond to a request for a new augment.

FIG. 6A is a flow diagram illustrating a process 600 used in some implementations of the present technology for an artificial reality system shell to respond to a request for a new augment. In various implementations, process 600 can be performed by an artificial reality system shell in response to an augment request (e.g., generated with process 650-FIG. 6B). For example, the augment request can be generated from a user interaction with a UI control for creating augments (e.g., categories of augments can be selected from a launcher menu) or with an existing augment (e.g., pulling a spawnable element out of an existing augment). As another example, the request can be in response to logic performed by an existing augment (e.g., where an augment has logic to generate a manifest and request an augment when a certain context occurs). In some implementations, the augment can set properties and/or logic in the manifest or pre-defined manifests can exist which the augment can retrieve (e.g., particular augment types can have pre-defined manifests).

At block 602, process 600 can receive a request, associated with a manifest, for a new augment. As discussed above in relation to FIG. 5, the manifest can specify properties and/or logic for the new augment, such as display modes (e.g., one or more context factor values that must occur for the display mode to be enabled, types of surfaces on which the augment can be placed in that display mode, a location, shape, or orientation, whether the augment is moveable, a volume for audio presentation data, etc.), a title, an ID, and augment type, an owner of the augment, an initial location for the augment, etc. In some implementations, default or inherited properties and/or logic can also be specified for the augment, such as having all augments include certain display modes that correspond to artificial reality system modes (e.g., audio only, minimized, interactive, etc.). In some implementations, the display modes in the manifest can extend these default display modes, allowing the default display modes to set constraints for the extended display modes. Examples of the context factors that the conditions for various display modes can specify include features of surfaces, relationships to other real or virtual objects, movement characteristics, lighting, time, date, user interactions, detected sounds, artificial reality system modes, etc. Examples of pre-defined augment types can include person, 2D object, 3D object, post, event, or freeform. In some implementations, the augment types correspond to types of nodes in a social graph. In some implementations, augments of particular types can have defaults for that type, such as default properties, logic, and/or automatically added content items (e.g., a post augment can have a pre-defined visual structure, controls, and content automatically added based on a node in a social graph corresponding to the post).

At block 604, process 600 can generate an augment with values and/or logic set based on the manifest associated with the new augment request. In some implementations, this can include creating an augment data structure similar to data structure 500 (FIG. 5). In some implementations, default, type-based or other values separate from the manifest can also be set in the augment data structure.

At block 606, process 600 can return, in response to the request, a handle to the generated augment. This handle can enable the requestor to begin filling the augment and/or place the augment in the artificial reality environment. Notably, this allows the requestor to begin filling it and/or place it before the augment is fully formed. For example, the augment may have default or type-specific content still being written into it by the artificial reality system shell, may not yet be registered for context factor notifications, or may have other initialization procedures yet to be completed when the handle is provided. Such additional parts of the initialization can be completed while the requestor uses the provided augment handle. Thus augment placement and content filling can be performed simultaneously with initialization procedures, providing significant efficiencies.

At block 608, process 600 can register the augment for context factor notifications. Registering an augment for context factor notifications can include assigning an identifier for the augment to each context factor on a list of context factors for which the augment is being registered. Additional details on notifying augments of context factor changes are provided below in relation to FIG. 7. The context factors for which the augment is registered can be selected based on the contexts specified in the manifest (or in other parameters set for the augment). For example, process 600 can analyze the display modes defined for the augment to determine which context factors would have to be checked to determine whether to enable each display mode and can register the augment to be notified of changes to any of those context factors. Additional initialization of the augment can also be performed at block 608, such as the shell adding content items for the specified augment type to the augment.

At block 610, process 600 can perform an augment placement procedure. In some implementations, block 610 can be performed prior to block 606, e.g., setting an initial augment placement before providing the handle to the requestor, for the requestor to update the placement. The placement procedure can include setting a default location or a location specified in the request received at block 602 (e.g., a location based on the user's focus area, a location relative to the requesting entity such as the same surface a requesting augment is attached to or surface defined for the hands or face of a user associated with the request). In some implementations, the placement procedure can include making the augment invisible until the requestor selects a location. In some implementations where a user is involved with manually selecting a placement location, the artificial reality system can highlight valid locations for the current display mode of the augment. For example, if the current display mode for the augment specifies that the augment must be placed on a vertical surface, surfaces established on walls in the artificial reality environment can be highlighted as a visual affordance so the user knows where she can place the augment. Following the placement procedure of block 610 (or the context factor registration of block 608 if block 610 is performed earlier) process 600 can end.

Figure 6B:
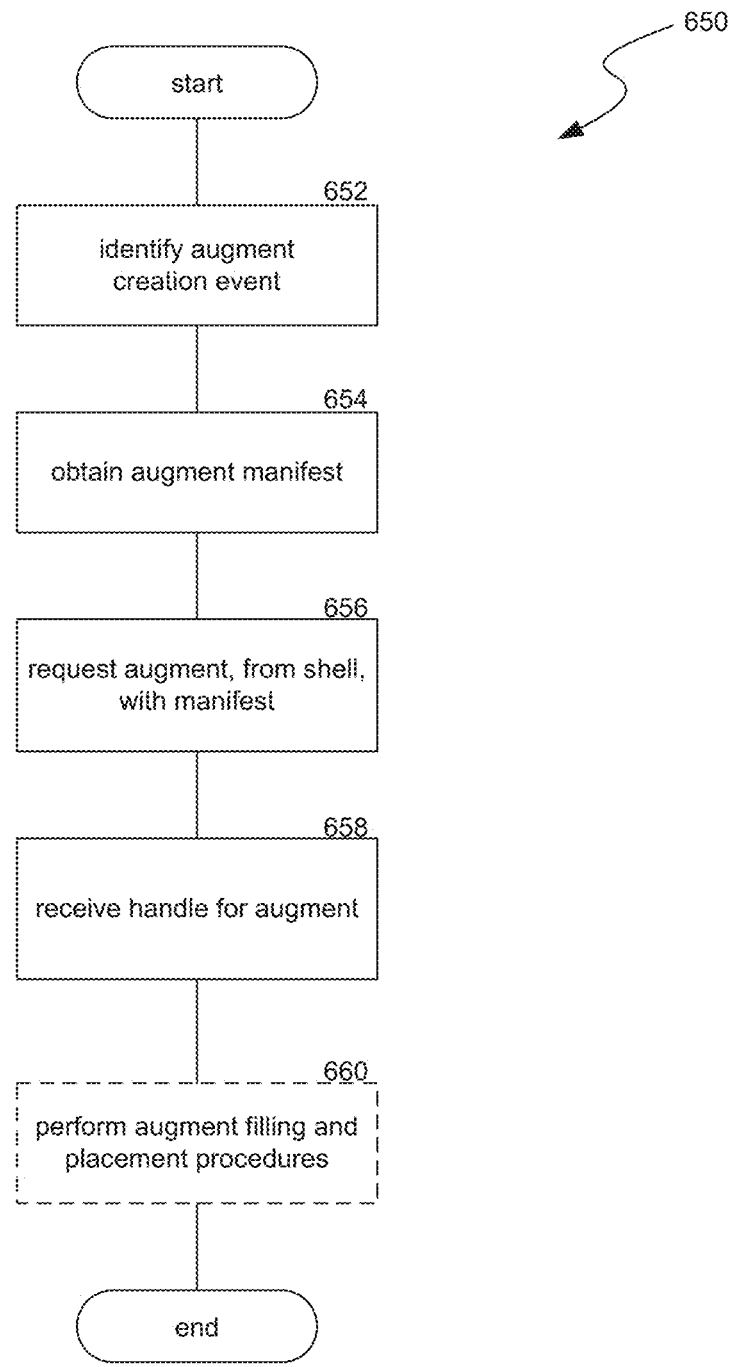
FIG. 6B is a flow diagram illustrating a process used in some implementations of the present technology for submitting, to an artificial reality system shell, a request for a new augment.

FIG. 6B is a flow diagram illustrating a process 650 used in some implementations of the present technology for submitting, to an artificial reality system shell, a request for a new augment. Process 650 can be performed by the shell or an existing augment, either of which can monitor for augment creation events based on user interactions or context factors. At block 652, process 650 can identify an augment creation event. For example, a user can perform an interaction such as activating a sell control (e.g., activating an interface for augment selection and identifying one or more augments to instantiate) or selecting a content item in an existing augment defined for spawning new augments (e.g., content items may be given a visual affordance when their selection can cause spawning a new augment, such as when the content item is associated with a manifest). As a more specific example, a spawnable content item could be a photo in a social media post augment which can spawn a photo augment when a user performs a grab gesture on the photo and pulls it out of the post augment.

Existing augments can also execute logic based on the current context to generate a new augment request. As an example, a 3D model augment that is on a stovetop surface and that depicts a clock can update its display based on a global time variable. The clock augment can be registered with the artificial reality system to receive, when a user moves the clock augment to be in contact with the object, context factor notifications for the object. When such a context factor is provided to the clock augment, it can invoke internal logic that determines that the other object is tagged as food and requests a new 3D model timer augment to be placed above the object. Upon receiving a handle to the timer augment, it can fill the augment with a countdown timer model with an amount of time set based on a mapping of types of food to cooking times.

At block 654, process 650 can obtain a manifest corresponding to the augment creation event identified at block 652. In some implementations, the manifest can be a predefined manifest specified for a type of augment corresponding to the augment creation event. In other implementations, the augment creation event can be associated with an existing manifest or logic for generating a manifest. For example, a content item added to an augment can be associated with a manifest to use if the content item is selected to spawn a new augment. As another example, logic for an augment can have various manifest templates, one of which can be selected and filled on based on user actions and/or other context factors.

At block 656, process 650 can send, to the artificial reality system shell, a request for a new augment in association with the manifest obtained at block 654. The artificial reality system shell can respond to this request using process 600 (FIG. 6A), which provides back a handle to the new augment, which is received at block 658.

While as discussed above, in various implementations, blocks of the processes described here can be removed or rearranged, block 660 is shown in broken lines to call out that bock 660 may not be performed in some instances. For example, block 660 may not be performed where a position was provided with the new augment request for the shell to set an augment position, where the provide augment is not moveable, where augment positioning is otherwise facilitated by the artificial reality system shell via process 600, etc. When block 660 is performed, at block 660 process 650 can place the new augment (e.g., location and/or orientation) in the artificial reality environment. In some implementations, the augment can be initially attached to the user's hand, can be at a default location, at a location relative to a requesting augment, etc. The requesting augment and/or user can invoke functionality of the new augment to place it in the artificial reality environment, e.g., where a user performs a gesture to move the augment (causing a call to a setLocation function of the augment).

In addition, once process 650 receives the handle for the augment, it can begin adding content to the augment. In some implementations, the augment can be pre-filled with some content, e.g., added by the artificial reality system shell. In some implementations, process 650 can add content to the augment by calling a function of the augment (accessible via the handle), passing information such as a reference to the content, a position within the augment where the content should be displayed, which display modes show the content, whether the content can spawn a new augment, etc. In some cases, adding content to an augment can include adding new logic to the augment and/or registering the augment to receive additional context factor notifications. In some implementations, the artificial reality system shell can provide the handle to the augment before the augment is fully initialized, allowing the augment placement and/or content filling to be performed before as the artificial reality system shell completes augment creation. Following adding augment content and/or augment placement, process 650 can end.

Figure 7:
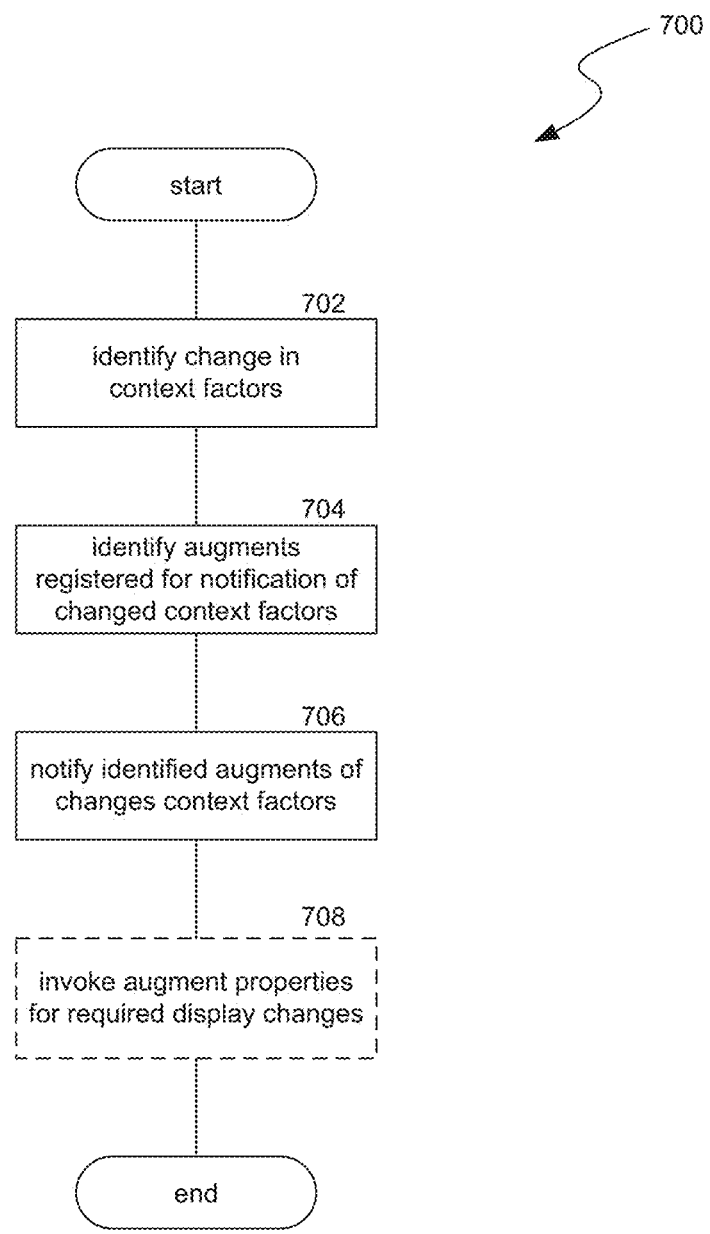
FIG. 7 is a flow diagram illustrating a process used in some implementations of the present technology for enabling augments to respond to a context by providing context factors to relevant augments.

FIG. 7 is a flow diagram illustrating a process 700 used in some implementations of the present technology for enabling augments to respond to a context by providing context factors to relevant augments. Process 700 can be performed by a portion of the artificial reality system that receives artificial reality environment and sensor data (e.g., SLAM data, data from IMU or other sensors connected to the artificial reality system, camera data) and from systems that analyze and classify such data (e.g., gesture recognizers, object identification systems, environment mapping systems, surface identification systems, etc.) Performing process 700 by this artificial reality system can be in response to periodic context factor checks or based on triggers that occur upon certain sensor, data analysis, or artificial reality environment events.

At block 702, process 700 can identify a change in (or establishment of) one or more context factors. In some implementations, this can include determining a change in a context factor value that is above a threshold established for that context factor. For example, movement of an object can be considered a context factor when the object is determined to have moved at least half an inch. As another example, an audio context factor change can be identified when a volume of the audio change is above 15 decibels.

At block 704, process 700 can identify augments registered for notification of changed context factors. This can be determined based on a mapping of context factors to existing augments, such as the mapping created through iterations of performing block 608 (FIG. 6A). At block 706, process 700 can notify the augments identified at block 704 of context factor changes identified at block 702 for which those augments are registered to receive signals of those context factor changes.

In some implementations, providing those notifications to the augments can cause the augment to invoke corresponding logic. For example, the augment can determine whether the context factors provided to the augment match conditional statements defined for display modes and whether the values provided for these context factors, when used in evaluating the conditional statements, cause a conditional statement to evaluate to true, enabling the corresponding display mode. This can include applying context factors to an ordered set of display modes. For example, this can include finding the deepest display mode in a hierarchy of display modes that extend each other or traversing the display mode hierarchy to enable each successive display mode that has a conditional statement that evaluates to true and for which its parent display mode (which it extends) has been enabled. In some implementations, providing context factors can also cause an augment to invoke logic, e.g., executing functions that are mapped to conditional statements or that take context factors with known values as parameters.

While as discussed above, in various implementations, blocks of the processes described here can be removed or rearranged, block 708 is shown in broken lines to call out that bock 708 may not be performed in some instances. For example, block 708 may not be performed where the artificial reality system shell does not perform a separate step to ensure augments meet certain constraints, such as constraints applied in for particular modes. Block 708 may not be necessary where the artificial reality system shell has created the augments in such a way that all augments must enable matching display modes upon receiving the context factors and by ensuring that the augments include required logic and properties (e.g., display modes for particular artificial reality system modes) that cannot be altered (e.g., by only allowing additional display modes to extend the required display modes without being able to overwrite constrained display properties when extending a display mode). However, block 708 may be performed in other situations, such as where an owner of an augment can provide display modes that can be activated which do not conform to system constraints. At block 708, process 700 can invoke augment properties for required display changes. This can include disabling the augment, causing the augment to switch to a different display mode, or not allowing the augment to output part of its current presentation data (e.g., changing the augment shape or clipping output that is outside a boundary area). For example, the artificial reality system can switch from an "interactive mode," where augments are allowed to use their entire volume at any allowed location, to an "active user mode," where the center of the user's field of view is to be kept free with virtual objects being moved to a surface docked to the side of the user's field of view. In this mode, the artificial reality system can clip any augment that is displaying content beyond a maximum augment size defined for this mode and can ensure all augment locations are set to the side docked surfaces. After block 708 (or block 706 if block 708 is not performed), process 700 can end.

Surfaces are areas in a 3D artificial reality environment to which augments can be attached. Surfaces can be flat spaces (e.g., walls, tables, etc.), areas or volumes around an object (e.g., a user's face, a monitor, a book, etc.), or an area or volume in space (e.g., a point, plane floating in space, or a volume anchored to a place). Surfaces can be defined by the user with various gestures or automatically by the system (e.g., upon recognizing certain specified objects or objects that a user has interacted with). For example, a surface can be an area (bubble) around the user, an identified flat surface, or a volume. In some implementations, surfaces can be determined through both automated and user action, e.g., the system identifies a space and a user updates or modifies the surface properties. Surfaces can automatically be assigned some properties such as size, orientation, shape, or meta-tags (based on object recognition), and users can define other properties which may be from a pre-defined set of property categories.

Augments can be added to a surface, e.g., by placing an augment on or near a surface. Surfaces can include layouts that control how the augments attached to the surface will be arranged when placed on the surface. Surface layouts can be user selected or automatic (e.g., based on surface size, shape, or other surface characteristics and/or based on number, size, or type of augments placed on the surface). In some cases, surfaces can be nested with one surface added to another surface. When an augment is placed on a surface (or generated on a surface—e.g. when an app is opened while the user focuses on a surface), properties of the surface can be provided to the augment, which the augment can use to configure its display or actions. The app that created the augment can define the rules for how the augment displays itself or how the augment acts in different surface contexts.

Figure 8:
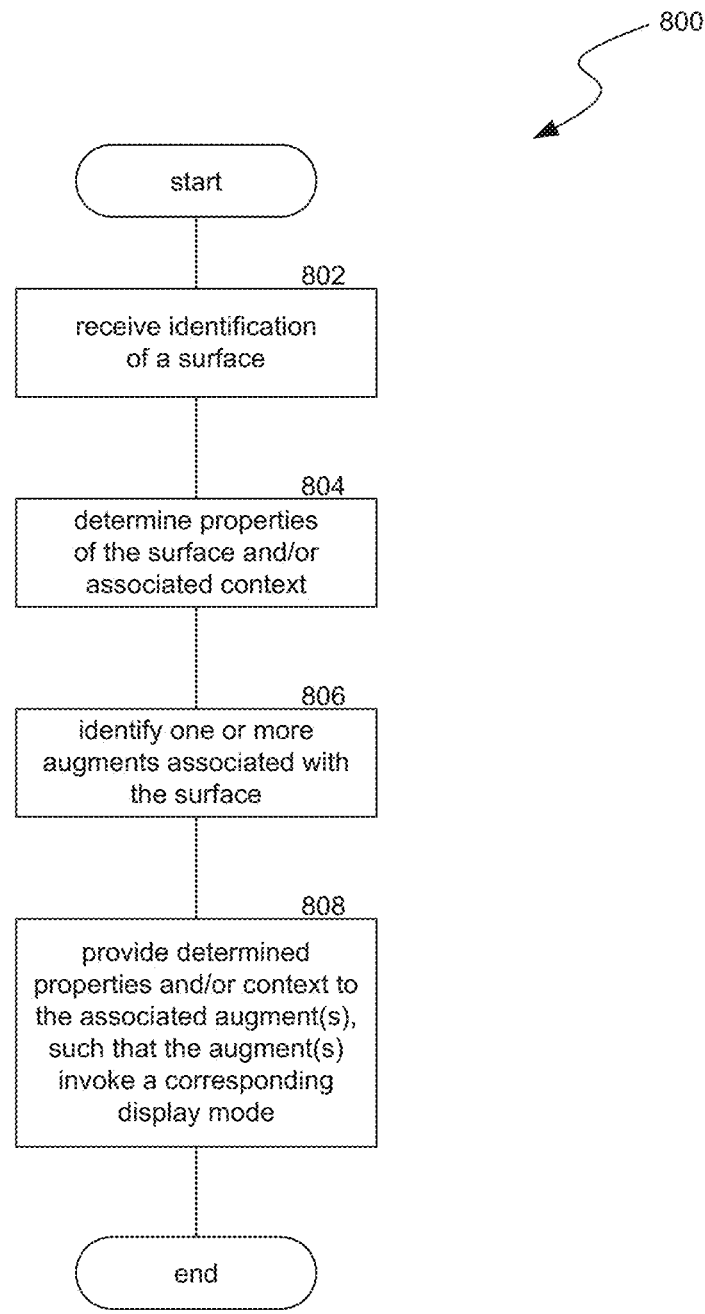
FIG. 8 is a flow diagram illustrating a process used in some implementations of the present technology for augments to interact with virtual surfaces.

FIG. 8 is a flow diagram illustrating a process 800 used in some implementations of the present technology for augments to interact with virtual surfaces. In some implementations, process 800 can be performed when an augment is associated with a surface, such as when an augment is initially created on a surface or later placed there through user interaction, direction of another augment, execution of logic for the augment, or a change in the augment's display mode causing it to be added to a particular surface.

At block 802, process 800 can receive an identification of a surface. This can be an existing surface or a surface created to accommodate a new augment. In various implementations, an artificial reality system can have created one or more surfaces. In various implementations, surfaces can be (i) synthetic (generated automatically by the artificial reality system without regard to the environment, e.g., not world-locked), (ii) semantic (detected by machine learning recognizers e.g., hands, faces, table, or other particular objects, etc.), or (iii) geometric (identified geometries in the environment e.g., floors, walls, etc.) Thus, the artificial reality system can create surfaces by defining surfaces relative to the artificial reality system position, by identifying artificial reality environment surface geometries or object types specified for creating a surface, or in response to a user defining a surface (e.g., by performing an air tap, outlining a surface with a gesture, putting a hand, controller, or other peripheral device on the surface, defining an plane in the air with her hand to be used as a surface, interacting with an object type, such as handlebars on a bike, to define a surface, etc.)

At block 804, process 800 can determine properties of the surface and/or an associated context. Surfaces can have properties such as a type of objects that can be placed on the surface, a surface shape, a location in the artificial reality environment, a list of augments on the surface, meta-tags (e.g., machine learning tagging such as for recognition of real-world objects on surface, surface type, etc.), a layout, or other characteristics. A surface layout can be user selected or automatically selected e.g., based on surface size; surface shape; number, size, or type of augments placed on the surface, etc. In some implementations, a layout can be dynamic e.g., a first item added to the surface goes in the middle, a second added augment moves first so the layout is two side-by-side elements, a third added augment moves first and second, so the layout is three equally spaced side-by-side elements, etc. Example dynamic layouts include a list, e.g., a horizontal line of augments, spaced uniformly from each other; a stack, e.g., a vertical line of augments, spaced uniformly from each other; a grid, e.g., a 2D or 3D grid of augments with x, y (and z) counts specified according to the number of augments on the surface; and a freeform surface, e.g., no set layout slots where augments sit where they were placed. In some implementations, one or more surface properties can be set to a default or to defaults selected based on a mapping of specified surface characteristics (e.g., orientation, object type, shape) to other surface characteristics (e.g., layout, meta-tags, etc.)

At block 806, process can identify one or more augments associated with the surface. This can be augments attached to the surface or within a threshold distance of the surface. In some implementations, an augment can be associated with a surface in response to a user placing it on the surface (or otherwise performing an interaction to connect the augment to the surface, e.g., based on user attention, a voice command, etc.) In other cases, an augment can be spawned on the surface e.g., by another augment on the same surface. In yet other cases, logic of the augment or a display mode of the augment can cause the augment to attach to a surface or the closest surface of a particular type.

In some implementations, surfaces can be a type of augment in the artificial reality environment and some surfaces can be added to other surfaces, allowing surfaces to be nested within another surface. In some implementations, surfaces can have logic that automatically populates augments onto itself, e.g., based on the surface type, parameters and information known about the user, etc. For example, a refrigerator surface can automatically populate itself with recipes because it has a "food" meta-tag and recipes can be based on the user's history of "liking" certain types of food identified in a social graph.

At block 808, process 800 can provide the properties and/or context factors determined at block 804 to the associated augment(s) identified at block 806, such that the identified augment(s) can invoke corresponding logic or a display mode. For example, the surface can indicate a position for an augment, such as an open slot in a layout for the surface, which the augment can move itself to by setting its location properties. As another example, properties of the surface, such as whether it is a vertical or horizontal surface, can be indicated to an augment, causing the augment to select a corresponding display mode. As yet a further example, other objects associated with the surface can be indicated to an augment, allowing the augment to invoke logic corresponding to those objects or types assigned to those objects. As a more specific example, when a social media "post" augment is placed on a surface, it can be informed that a "person" augment is also on that surface, which can invoke logic defined for the post augment to tag people in the post when those people have an augment assigned to the same surface. After providing the properties and/or context factors to the determined augments at block 808, process 800 can end.

Figure 9:
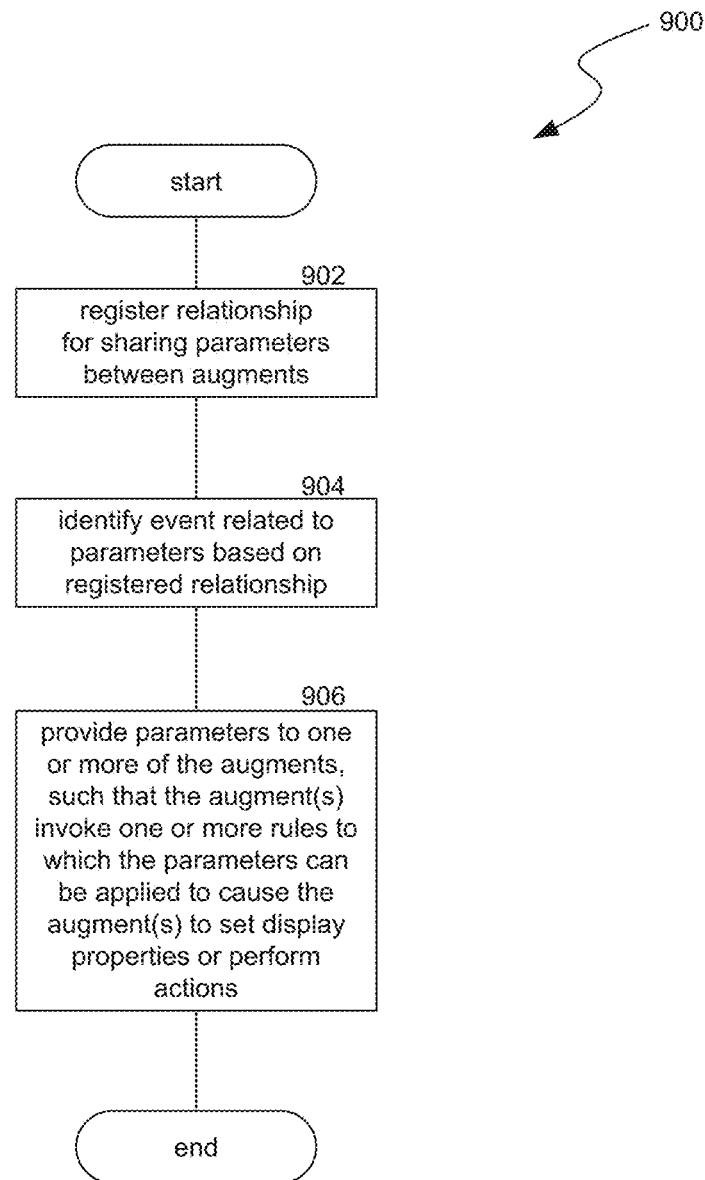
FIG. 9 is a flow diagram illustrating a process used in some implementations of the present technology for augments to interact with other augments.

In some implementations, augments can interact with other objects (real and/or other augments) or events. For example, a "cooking" surface can have an egg-timer augment, and when that augment is dragged onto a real-world pot of water, the timer can automatically start counting. An augment can have logic and/or display modes defined by the augment creator and/or for the type of that augment that can be trigged when certain parameters or context factors are provided to the augment. FIG. 9 is a flow diagram illustrating a process 900 used in some implementations of the present technology for augments to interact with other objects. Process 900 can be performed in response to various events, such as augment creation, adding an augment to a surface, a user specifying an interaction between augments, or another event that forms a relationship between an augment and another object.

In some implementations, augments can receive parameters relating to other augments, such as the other augment's position, type, shape, content items written into that other augment, a handle to invoke logic in that other augment, etc. At block 902, process 900 can register a relationship for sharing such parameters between two or more augments.

In some cases, security and privacy policies can limit which parameters of one augment can be surfaced to another or can specify the situations where such sharing can occur. For example, augments may only be provided access A) to features for augments spawned by the same parent, B) only in response to a user action indicating an interaction between the augments (such as causing them to touch or dragging something out of one augment and into another), and/or C) when the augments are assigned to the same surface. In various implementations, the type of relationship can control which features can be provided between augments. For example, a user action that causes two augments to touch can cause sharing of a broad range of augment properties while two augments being on the same surface may only share location and object type properties between the augments.

In some cases, an augment can register with the shell of the artificial reality system to receive information about, or parameters from, other augments. In other cases, the shell can determine which such properties should be provided to the augment (e.g., based on an analysis of the manifest, provided to the shell to create the augment, to determine which parameters the augment logic and/or display modes need access to). In some implementations, the shell can include security and privacy policies that will control which properties, that an augment requests access to, are provided to that augment. For example, an augment can register to receive lighting status, user position, and identifications of objects within a threshold distance of it. The shell can determine whether the augment is allowed to receive such information and, if so, completes the registration to provide those parameters when they are set or change. In some implementations, the artificial reality system shell can have one or more global parameters that augments can pull the values of, such as a surface list, a current artificial reality system mode, the current time or date, etc.

At block 904, process 900 can identify an event related, based on the relationship(s) identified at block 902, to one or more augment parameters or context factors. For example, an event can be identified when a context factor, which an augment has registered to receive, is set or changes value; when an augment is placed in contact with (or within a threshold distance of) another augment; when a new augment is created; or any other event indicating an augment may respond to another object.

At block 906, process 900 can provide the one or more augment parameters or context factors, for the event identified at block 904, to one or more of the augments the event is related to. This can allow the receiving augment(s) to invoke logic and/or enable display modes corresponding to the received parameters or context factors. As discussed above, an augment creator can create logic or display modes for the augment which can be invoked or enabled upon receiving context factors or other information related to the logic or display modes or that causes a condition for the logic or display modes to evaluate to true. In some implementations, this logic or the display modes can be inherited, e.g., based on the augment being created as an instance of type of augment class with pre-defined logic or display modes (e.g., a person augment class that extends an augment class can have pre-defined logic for interacting with the depicted person's social media profile upon certain events occurring). After the parameters or context factors have been provided to the augment(s), process 900 can end.

Figure 10:
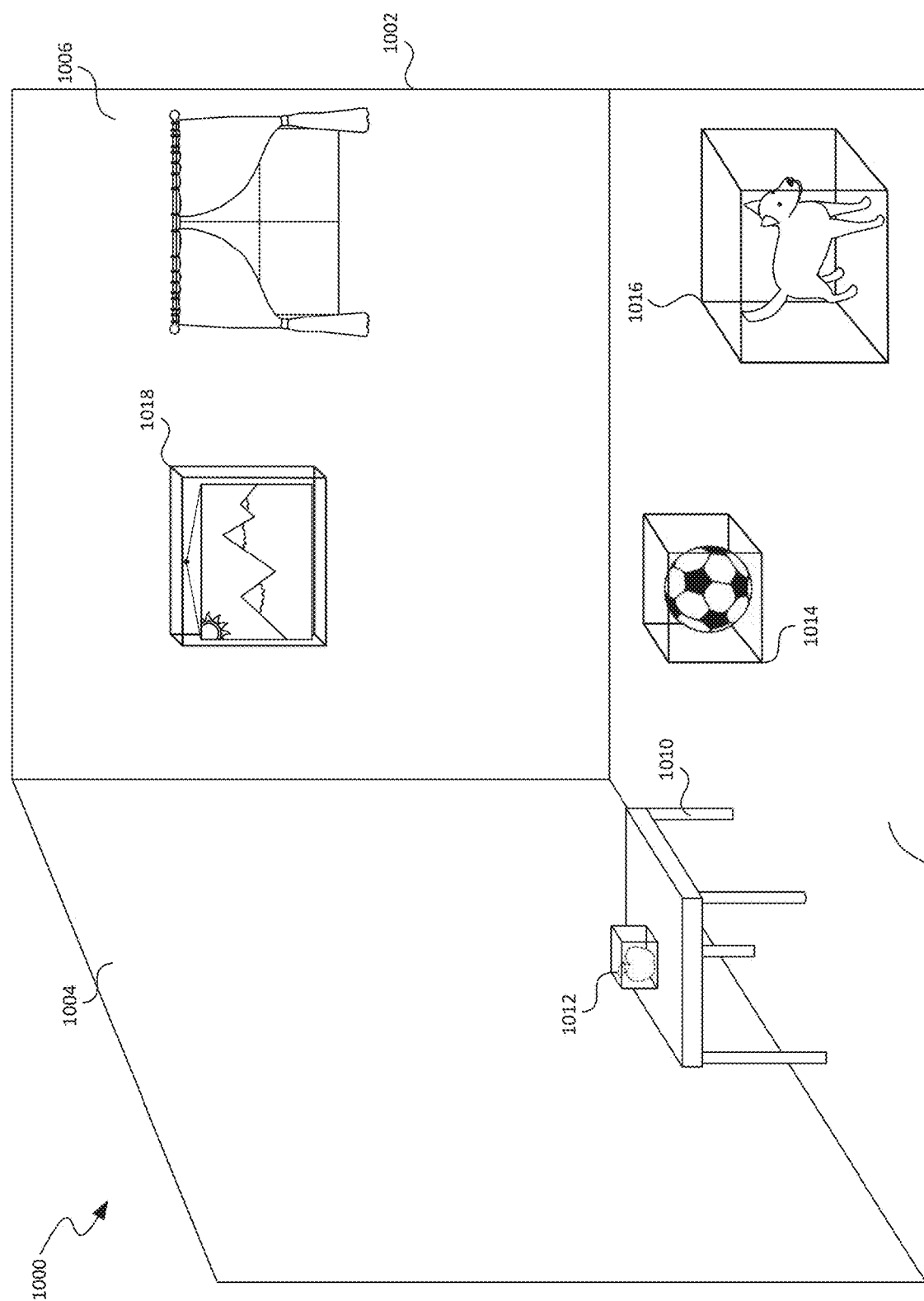
FIG. 10 is a conceptual diagram illustrating an example of augments in an artificial reality space, controlled by an artificial reality system.

FIG. 10 is a conceptual diagram illustrating an example 1000 of augments in an artificial reality space, controlled by an artificial reality system. The artificial reality environment illustrated in example 1000 includes a room 1002 with walls 1004 and 1006 and a floor 1008. The artificial reality environment in example 1000 is a mixed reality environment, including a real-world table 1010 and a real-world soccer ball 1014 with virtual objects of a dog 1016, an apple 1012 on the table 1010, and a picture 1018. In example 1000, properties can be assigned to both real and virtual objects, as indicated by the bounding boxes surrounding objects 1012-1018, indicating they have been identified by the artificial reality system which is maintaining a corresponding data structure (e.g., specifying location, shape, etc.)

Figure 11:
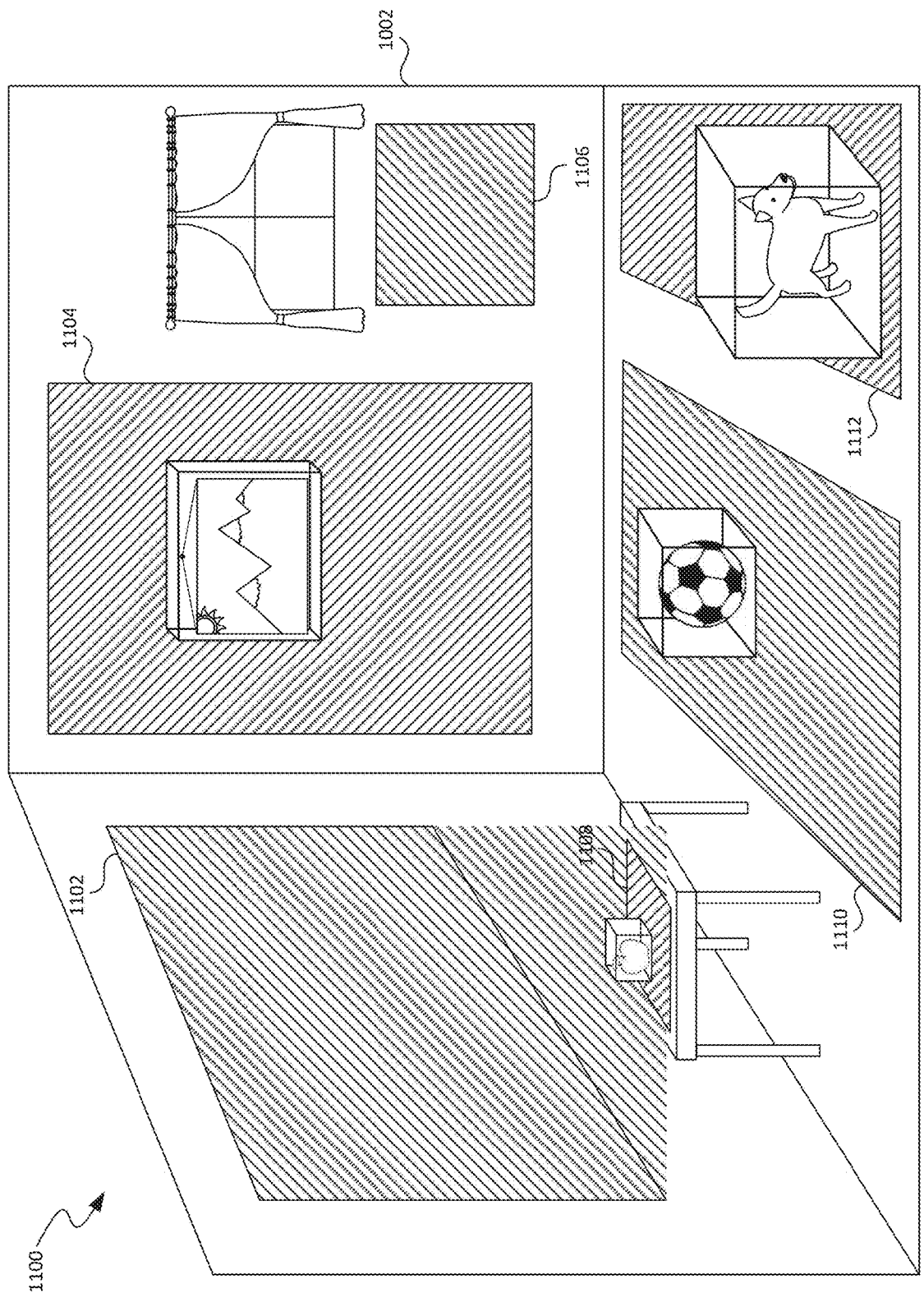
FIG. 11 is a conceptual diagram continuing illustrating the example of augments in the artificial reality space where the artificial reality system identifies virtual surfaces.

FIG. 11 is a conceptual diagram continuing illustrating the example 1000 of augments in the artificial reality space where the artificial reality system identifies virtual surfaces. In example 1000, the artificial reality system identifies geometric surfaces by automatically locating flat surfaces of at least a certain size. In this manner, the artificial reality system has automatically identified surfaces 1102 and 1104. The artificial reality system also identified a surface on the floor but the user instructed (not shown) the system to divide that surface into surfaces 1110 and 1112. The user also caused (not shown) the artificial reality system to create surface 1108 by placing her hand on the surface. Existing real and virtual objects located on these surfaces are automatically added to them.

Figure 12:
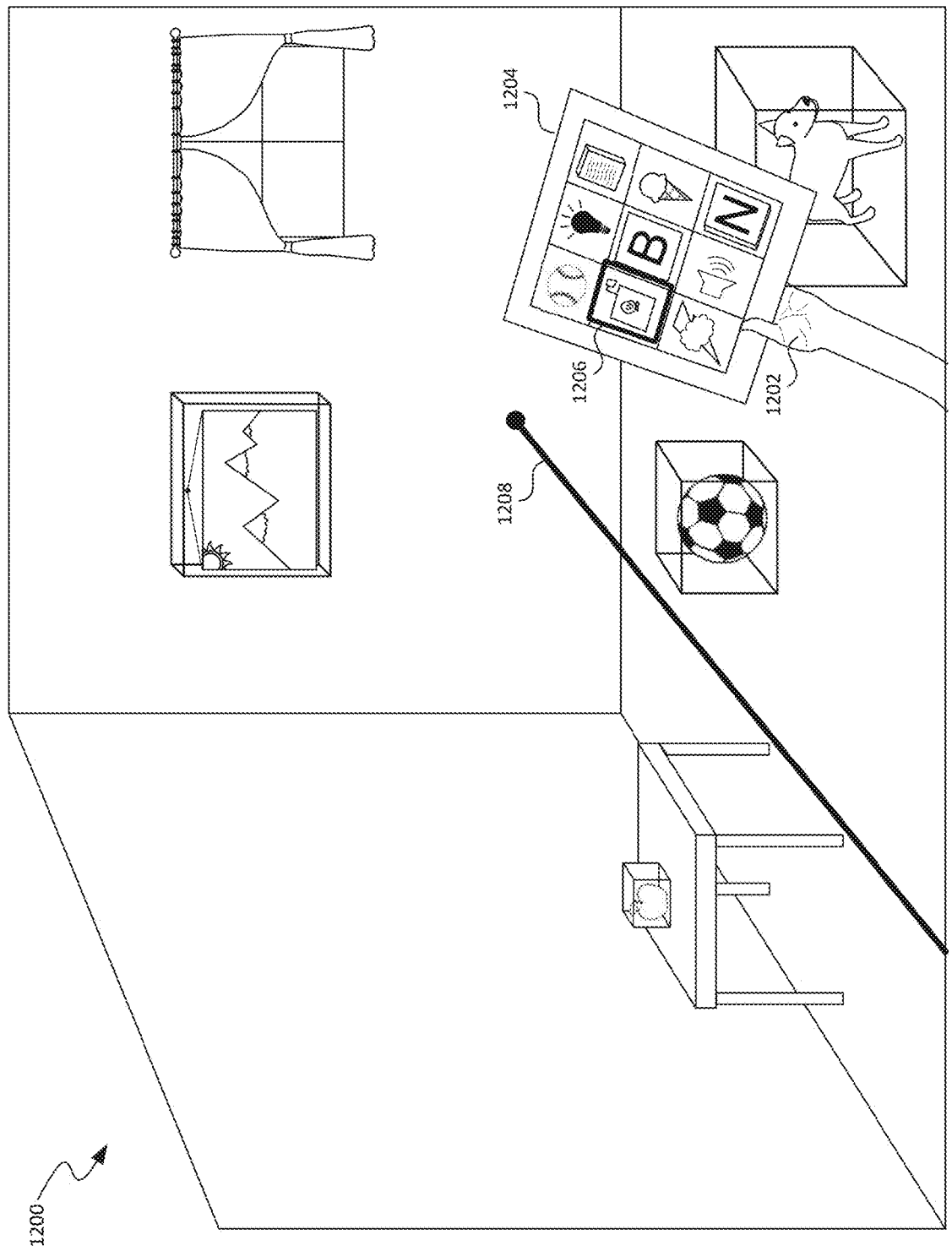
FIG. 12 is a conceptual diagram continuing illustrating the example of augments in the artificial reality space where the artificial reality system receives a request for a new photo augment to be initially placed based on user gaze.

FIG. 12 is a conceptual diagram continuing illustrating the example 1000 of augments in the artificial reality space where the artificial reality system receives a request for a new photo augment, to be initially placed based on user gaze. In response to a user command (e.g., activating a UI element—not shown) the artificial reality system attached a virtual tablet 1204 in the hand 1202 of the user, allowing the user to make various selections. In this example, the user has selected a pictures option 1206 from the tablet 1204 and selected (not shown) a picture to add to the artificial reality environment. Based on this selection, the tablet 1204 (also an augment) creates a manifest for a picture augment and sends the request to the artificial reality system shell (e.g., by performing process 6B).

Figure 13:
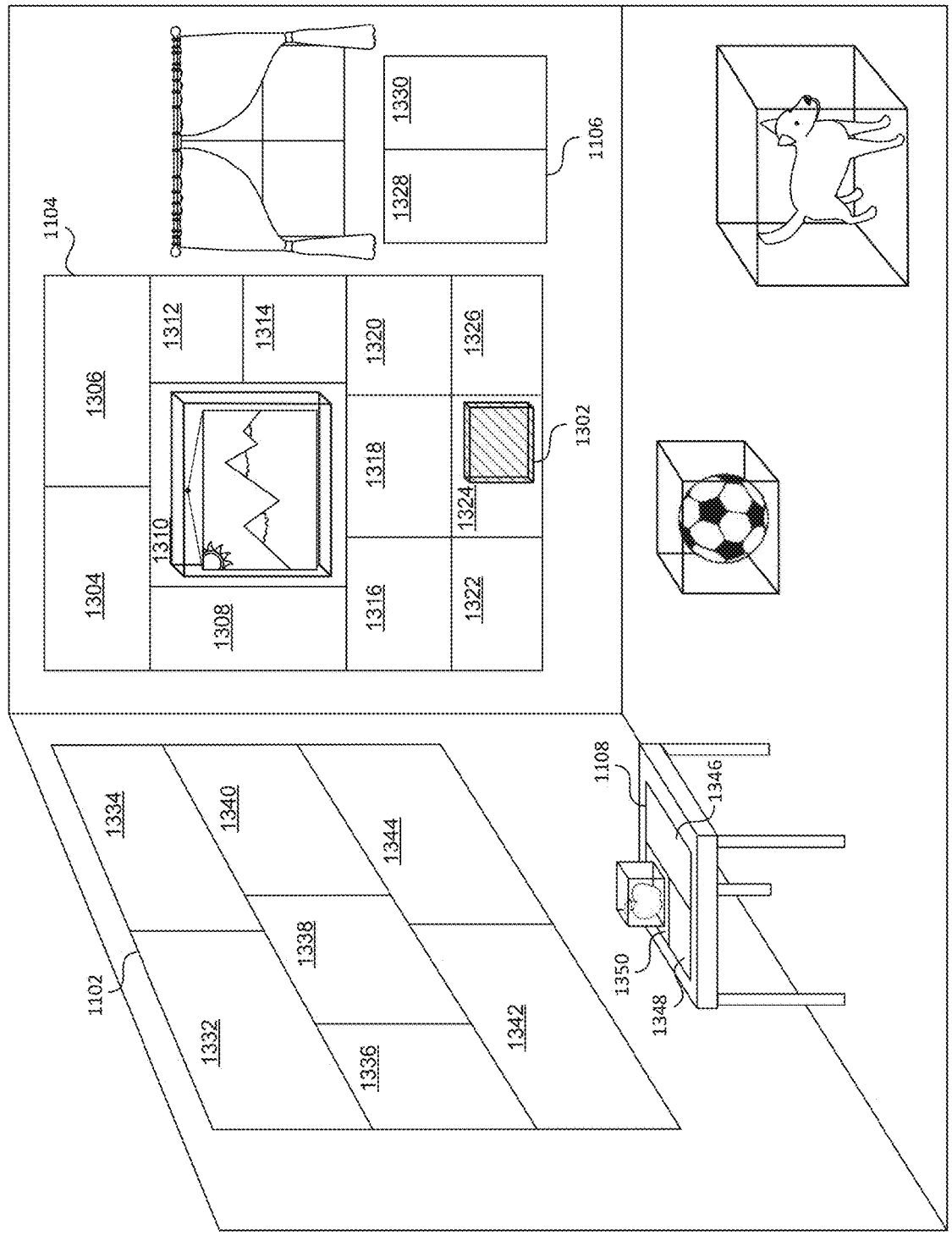
FIG. 13 is a conceptual diagram continuing illustrating the example of augments in the artificial reality space where the new empty augment is provided, initially placed on a wall, with additional placement visual affordances for surface layouts.
Figure 14:
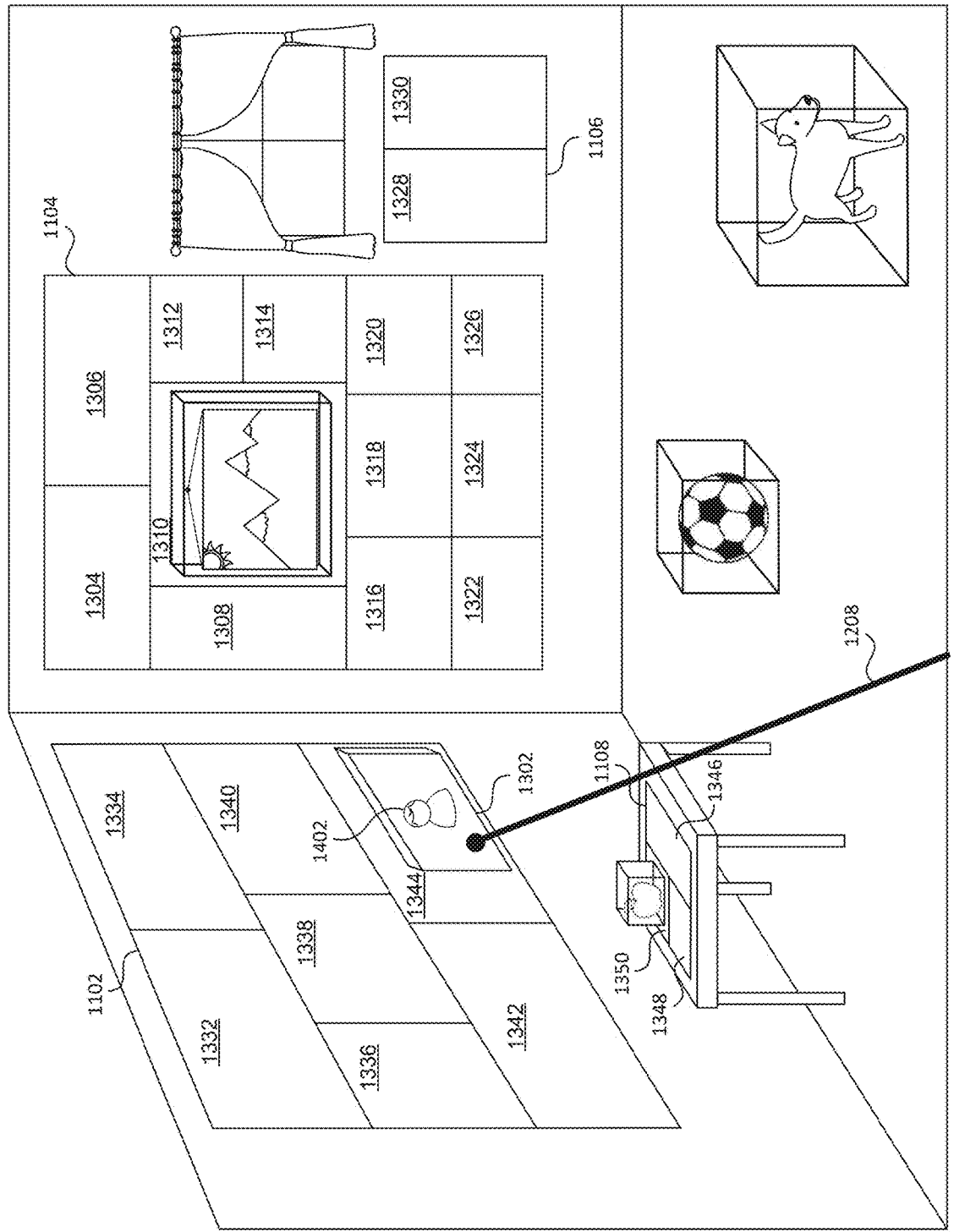
FIG. 14 is a conceptual diagram continuing illustrating the example of augments in the artificial reality space where the new augment has been filled and is moved to a second wall according to available surface layouts.

In FIG. 13, the artificial reality system, in response to the new augment request, creates augment 1302 (e.g., by performing process 6A). The artificial reality system is also tracking the user's gaze direction 1208 (FIG. 12) by using IMU sensors to monitor head position and cameras to model the user's eye position. Based on the monitored user's gaze direction 1208, the system automatically identifies surface 1104 as the surface to which to add a new picture augment 1302 in slot 1324 (of slots 1304-1326 of the layout for surface 1104). The artificial reality system shell provides the new empty augment 1302, initially placing it in slot 1324. A handle for augment 1302 is provided before the augment 1302 has been filled with content, allowing the user to make additional placement selections while the augment requestor writes content (the selected picture) into the augment 1302. In addition, while the empty augment 1302 is initially placed in slot 1324, the artificial reality system has identified additional surfaces and layout slots where the augment can be placed, and has provided visual affordances (1304-1350) to the user, indicating which spots are available for placement of the augment. In example 1000, these slots are identified because the manifest for the augment 1302 has indicated that the augment can be placed on any flat vertical surface or any flat horizontal surface that does not have a "floor" designation. In FIG. 14, the new augment 1302 has been filled with the picture 1402 that the user selected in FIG. 12 while concurrently being moved to slot 1344, selected by the user's gaze 1208 dwelling on slot 1344 for a threshold amount of time (e.g., three seconds).

Figure 15:
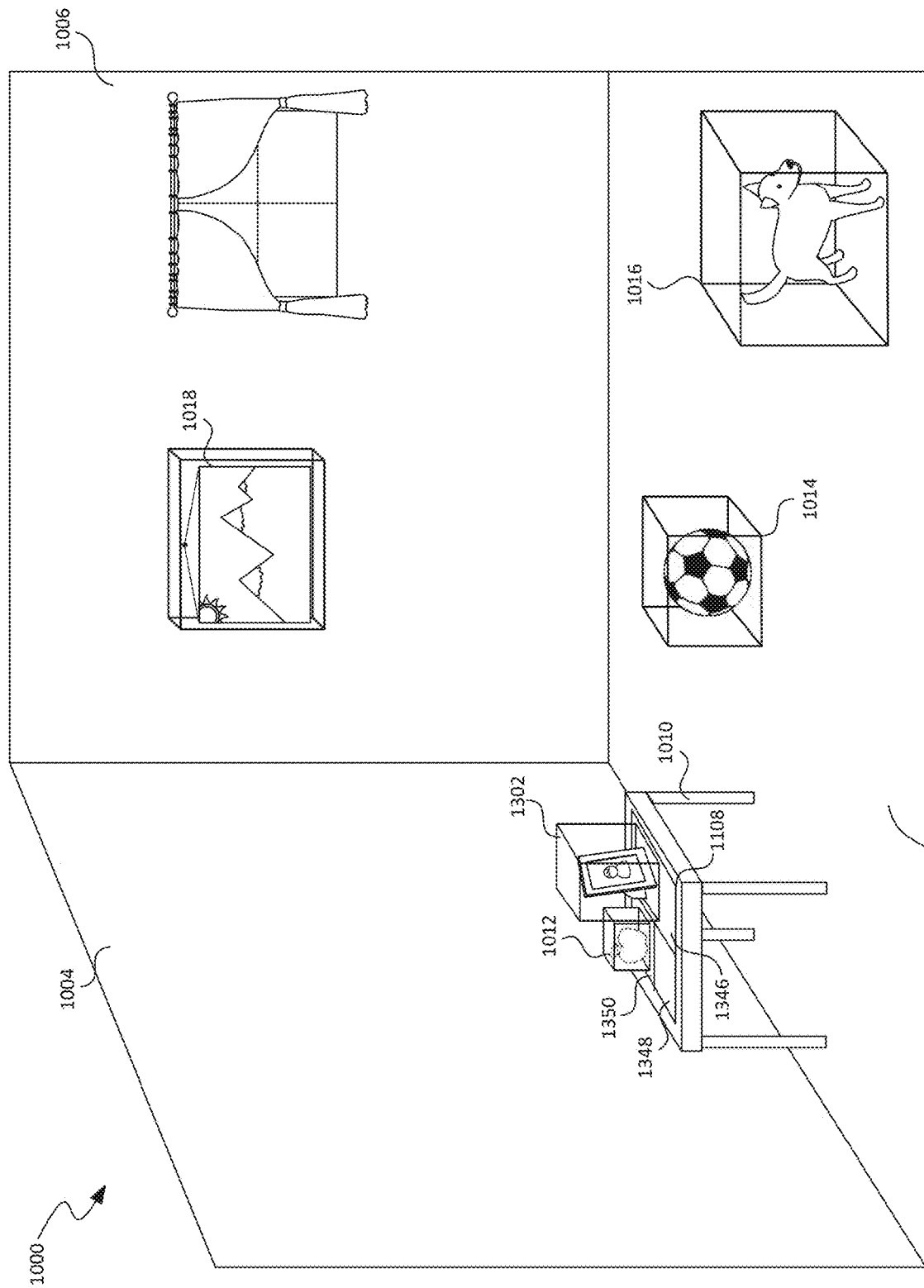
FIG. 15 is a conceptual diagram continuing illustrating the example of augments in the artificial reality space where the augment is moved to a horizontal surface and, in response to corresponding placement context factors, selects a different display mode.

FIG. 15 is a conceptual diagram continuing illustrating the example 1000 of augments in the artificial reality space where the augment 1302 is moved to a horizontal surface and, in response to corresponding placement context factors, selects a different display mode. The user had previously placed augment 1302 on the surface on wall 1004 (FIG. 14). The user can further move the augment, e.g., by indicating a new surface with the user's gaze, by performing a gesture (e.g., "dragging" the augment to a new location), with a voice command, etc. In example 1000, the user has selected to move the augment 1302 to the surface 1108. In response to the movement of the augment, the artificial reality system provides details of the surface to the augment 1302 (e.g., by invoking process 800—FIG. 8). The augment 1302 has multiple display modes. A first display mode was enabled due to the augment 1302 being on vertical surface 1102, causing the augment to be shaped as a wall hanging. A second display mode has an alternate condition that is true when the augment 1302 is on horizontal surface, such as surface 1108. By enabling this second display mode in response to being placed on horizontal surface 1108, augment 1302 reconfigures itself to appear as a standing picture frame. When the augment 1302 is placed on the surface 1108, the surface 1108 can identify a slot for the augment. In this example, surface 1108 has a layout with slots 1346, 1348, and 1350. There is already an object 1012 in slot 1350 and slot 1348 is too small for the augment 1302 in the current picture frame shape, thus surface 1108 selects slot 1346 for the augment 1302 and informs augment 1302 of its location on the surface 1108, allowing augment 1302 to set its location within the artificial reality environment to be in slot 1346.

Figure 16:
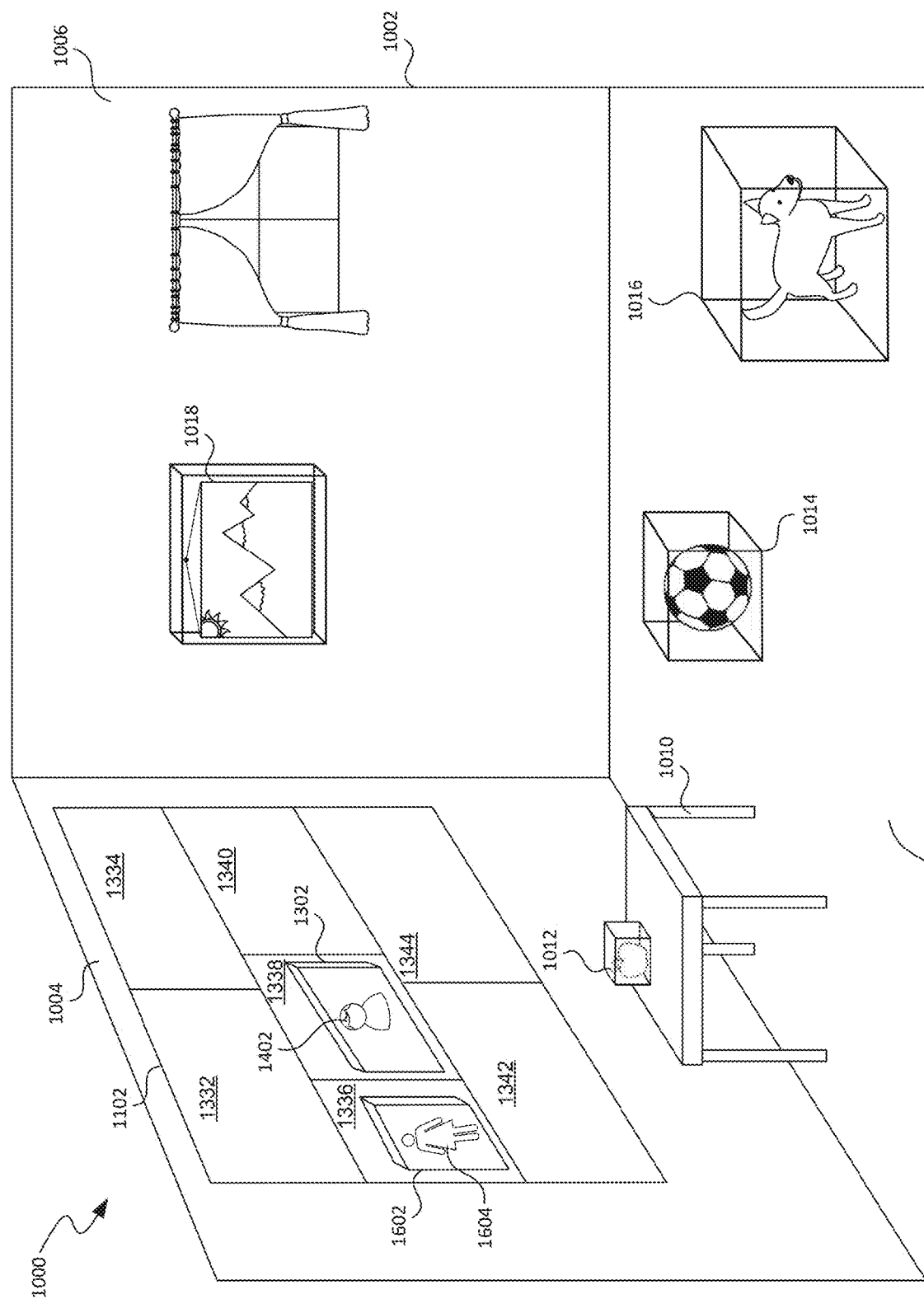
FIG. 16 is a conceptual diagram continuing illustrating the example of augments in the artificial reality space where the augment selects a different display mode in response to being moved back to the vertical wall surface with a second augment.

FIG. 16 is a conceptual diagram continuing illustrating the example 1000 of augments in the artificial reality space where the augment 1302 returns to the first display mode in response to the user moving augment 1302 back to the vertical wall surface 1102. The user has also selected a second picture of user 1604 to add to the artificial reality environment and has placed the resulting picture augment 1602 in slot 1336 on surface 1102. The selection and placement of augment 1602 occurred in a manner similar to the selection and placement of augment 1302 (FIGS. 12-14), by selecting the same picture option 1206 from virtual tablet 1204 (FIG. 12). In example 1000, augments that are created by the same requestor are allowed to share information. Further, the requests originating from selecting option 1206 include a manifest specifying logic for augments to interact in certain circumstances. One such function specifies that if two pictures are placed within a threshold distance of one another that depict users who, according to a social graph, are married, the augments attach themselves together to appear as a single augment with a heart border. To determine when to execute this logic, the augments register themselves with the artificial reality system to receive information about the placement and content of other picture augments placed on the same surface (e.g., using one or more of processes 700-900—FIGS. 7-9). In this example, when augments 1602 and 1302 are placed next to each other on surface 1102, the artificial reality system determines these augments are registered to be notified of surrounding augments created by the same requestor and provides these context factors to each augment, providing an identification of the users 1402 and 1604 depicted in each augment and access to a social graph for the augments to determine a relationship type between the depicted users.

Figure 17:
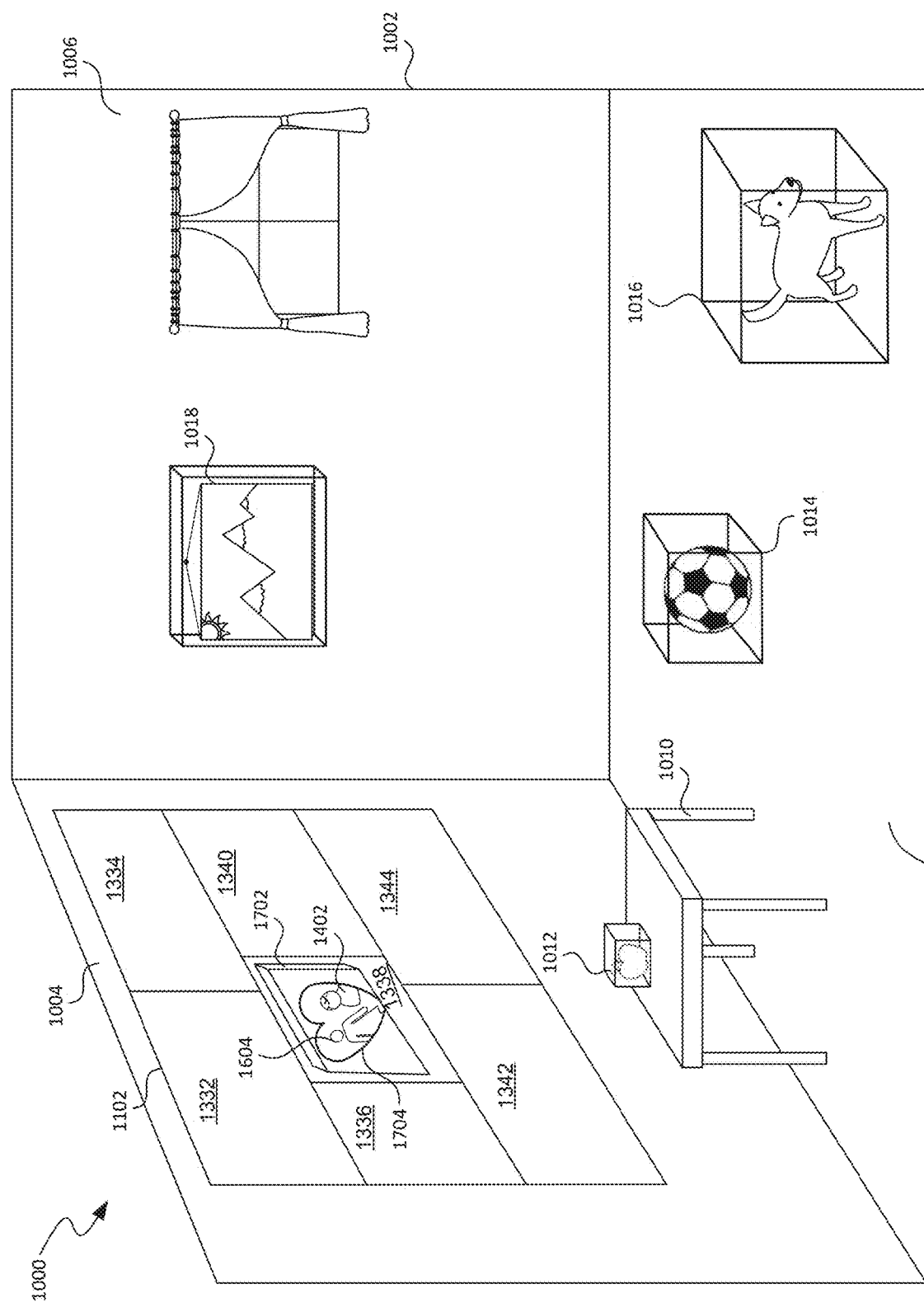
FIG. 17 is a conceptual diagram continuing illustrating the example of augments in the artificial reality space where the augment and the second augment select different display modes in response to receiving social graph context factors registered with the artificial reality system.

FIG. 17 is a conceptual diagram continuing illustrating the example 1000 of augments in the artificial reality space where the augment 1302 and the augment 1602 respond to the received context factors. The logic executed by the augments 1302 and 1602 causes the augment 1602 to move itself to share the slot 1338 with augment 1302 and causes each augment to change its display mode to appear as half of a wall hung picture 1702 depicting the users 1604 and 1402, with a half of surrounding heart 1704.

Figure 18:
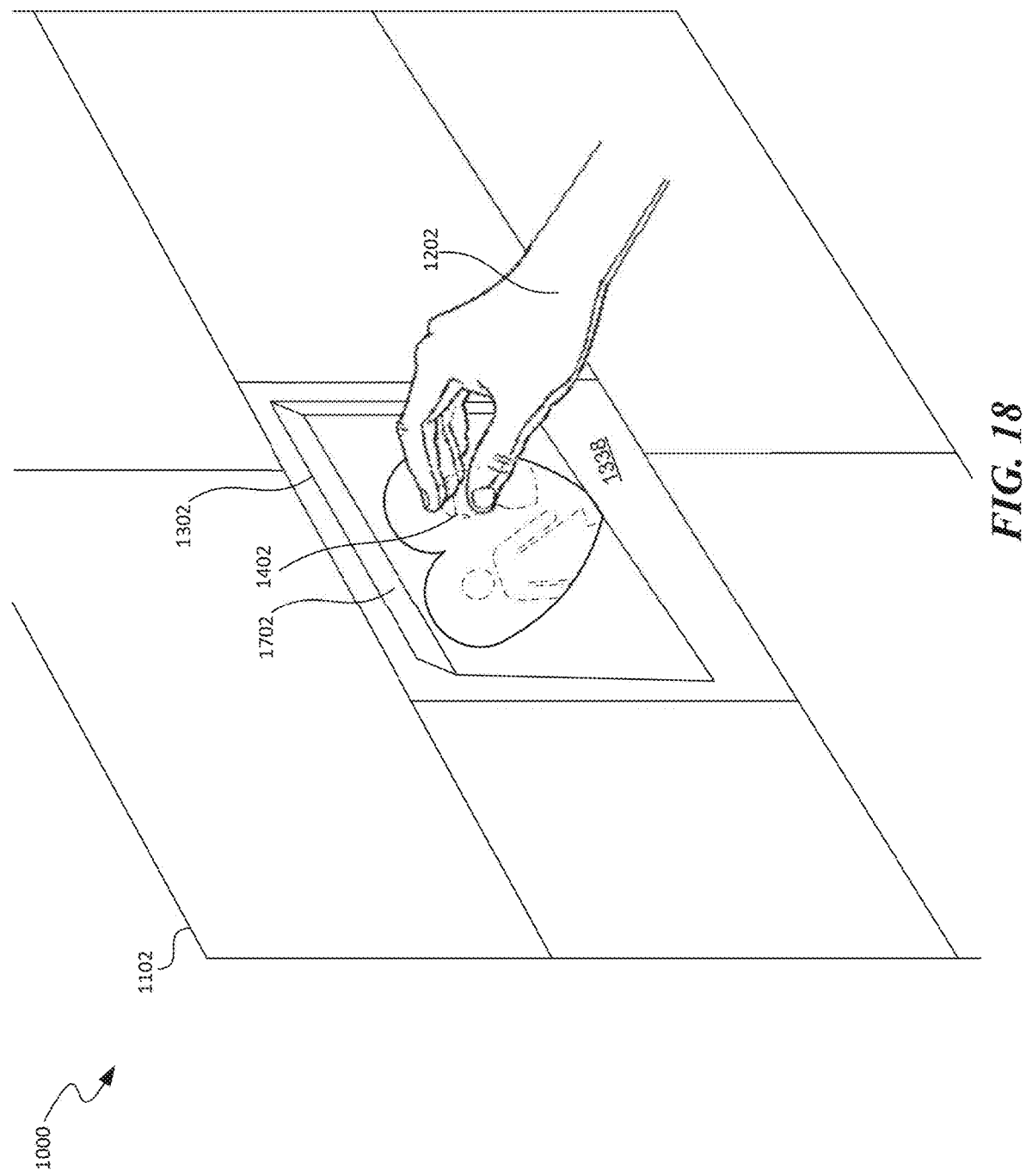
FIGS. 18 and 19 are conceptual diagrams continuing illustrating the example of augments in the artificial reality space where the artificial reality system creates a new augment in response to a user pulling a spawnable element out of the existing augments.
Figure 19:
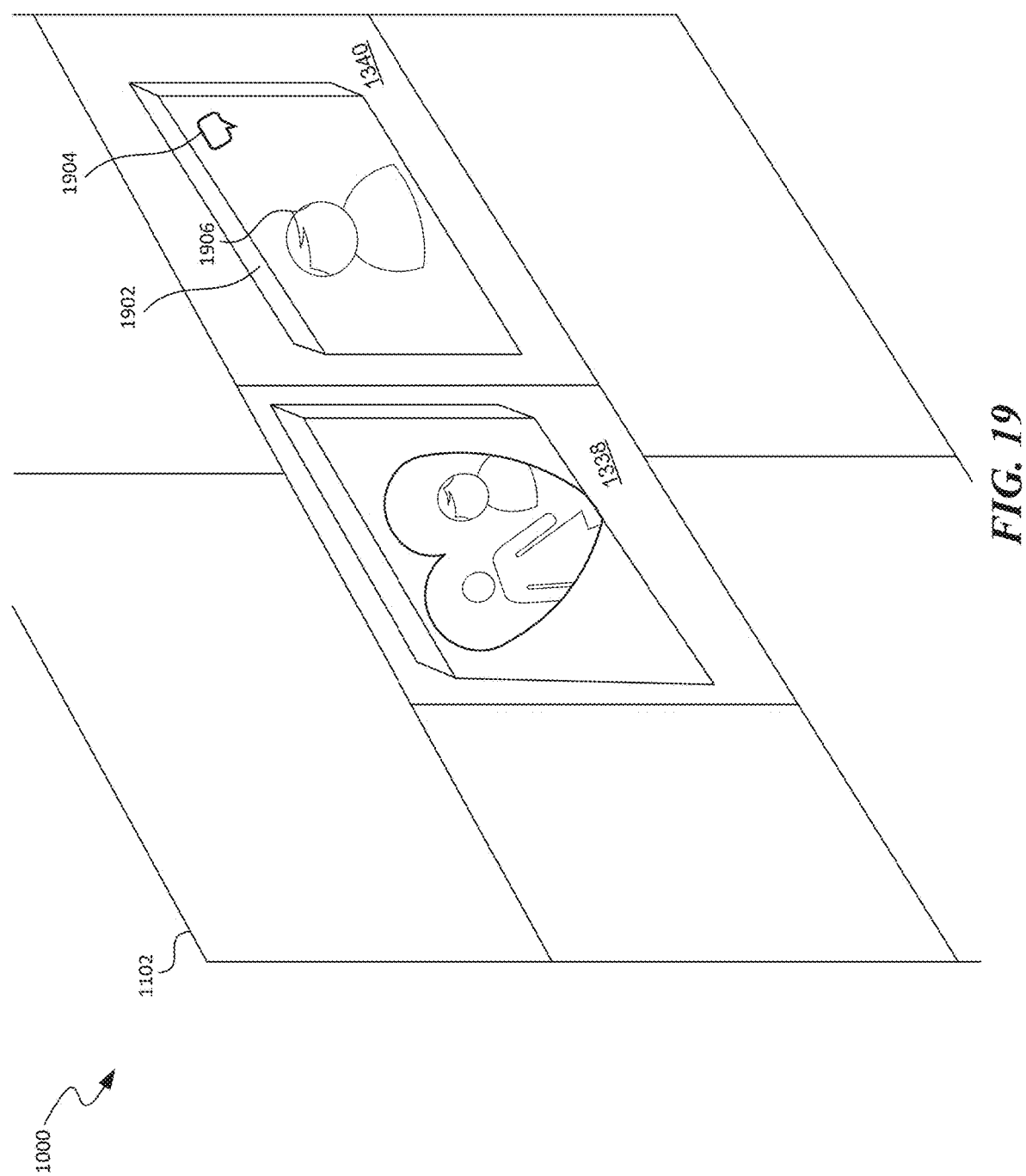

FIGS. 18 and 19 are conceptual diagrams continuing illustrating the example 1000 of augments in the artificial reality space (focused on surface 1102) where the artificial reality system creates a new augment 1902 in response to a user pulling a spawnable content item 1402 out of the existing augments 1702. In example 1000, a parent augment can have content written into it that a user can select to make a new child augment e.g., by performing a gesture that pulls the content out of the parent augment. In some implementations, content written into an augment is associated with a manifest (or a process for creating a manifest in response to content item selection). This can be a manifest that the parent augment creates, a pre-defined manifest selected for an augment type that the parent augment selects (e.g., a default manifest for a "person" augment, supplied with a person identifier), or a default, generic manifest. In some implementations, such content that can spawn other augments can be provided in the parent augment with an affordance, signaling that it can be pulled out of the parent augment. When the user pulls the content out, the associated manifest can be sent to the artificial reality system shell, which provides back a child augment, which the parent augment can then write to or set properties for (e.g., by supplying properties associated with the content that was pulled out).

In FIG. 18, the combined augments 1702 have been selected, causing visual affordances to show on content items that can be selected to spawn other augments, illustrated here as the content items being drawn with dashed lines, but can be other affordances such as changes in color, hue, shading, adding an animation, adding an icon, etc. The user's hand 1202 grasps spawnable content item 1402 and pulls it out of the augments 1702. This causes the augment 1302 (which as described above is the right half of the augments 1702) to request a new augment, supplying a default manifest for person augments with a specified person identifier that was associated with content item 1402. In this example, pulling a content item out of a parent augment does not remove the content item from the parent augment. In other implementations, an augment can be configured to remove a content item from the augment when the content item is pulled out. The artificial reality system receives the new augment request with the manifest and creates a new augment. In this example, creating new person augments includes retrieving, from a social media site, a profile picture content item 1906 that is associated with the person identifier specified in the manifest. The person augment 1902 is also filled with a message control content item 1904, which when activated displays a message interface for communicating with the depicted user. The augment 1902 is placed in the artificial reality environment according to where the user's hand 1202 performed a release gesture after pulling the content item out of the augments 1702, which in this case was in slot 1340 of surface 1102. The user can continue to perform actions in the artificial reality environment such as creating additional augments, causing augments to interact, defining surfaces, placing augments on surfaces, etc. as the user interacts with the artificial reality system.

Reference in this specification to "implementations" (e.g., "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for managing multiple virtual containers in an artificial reality environment, the method comprising:
   receiving an identification of a surface in the artificial reality environment, wherein the identified surface has properties including a location in the artificial reality environment, a surface type property, and a layout defining how a plurality of virtual containers can be placed when added to the identified surface;
   identifying at least one virtual container, of the multiple virtual containers, that is associated with the identified surface; and providing one or more of the properties of the identified surface to the identified at least one virtual container;
   wherein the identified at least one virtual container is configured to evaluate, based on at least one of the properties of the identified surface, one or more conditions associated with display modes for the identified at least one virtual container, to select a current display mode for presenting the identified at least one virtual container in association with the identified surface, and
   wherein the current display mode, of the display modes A) controls how the identified at least one virtual container writes content into a defined size or shape of an area or a volume set for the identified at least one virtual container in the current display mode and B) corresponds to the surface type property of the identified surface.

2. The method of claim 1,
   wherein the surface type property of the identified surface specifies a spatial orientation of the identified surface; and
   wherein the identified at least one virtual container evaluates at least one of the one or more conditions to select the current display mode that corresponds to the spatial orientation of the identified surface.

3. The method of claim 1, wherein the surface type property of the identified surface specifies an orientation of the identified surface or a type of object the identified surface is attached to.

4. The method of claim 1, wherein the surface type property of the identified surface specifies types of virtual containers that can be added to the identified surface.

5. The method of claim 1, wherein the properties for the identified surface further include tags identified by machine learning models trained to specify one or more of the tags for particular surfaces based on an identified context of each particular surface including at least one of surface size, surface position, real-world or virtual objects associated with that particular surface, or any combination thereof.

6. The method of claim 1,
   wherein the layout defines how the plurality of virtual containers added to the identified surface can be placed by defining slots on the identified surface; and
   wherein the identified at least one virtual container, when added to the identified surface, is assigned a slot, causing a location of the identified at least one virtual container to be set according to a location of the slot.

7. The method of claim 1,
   wherein the layout defines how the plurality of virtual containers, when added to the identified surface, can be placed by defining slots on the identified surface;
   wherein the identified at least one virtual container, when added to the identified surface, is assigned a slot, causing a location of the identified at least one virtual container to be set according to a location of the slot; and
   wherein the layout for the identified surface specifies one of:
      a list layout wherein the plurality of virtual containers added to the identified surface are placed in a horizontal line spaced uniformly from each other;
      a stack layout wherein the plurality of virtual containers added to the identified surface are placed in a vertical line spaced uniformly from each other; or
      a grid layout wherein the plurality of virtual containers added to the identified surface are placed on a grid with a number of grid slots in each dimension of the identified surface specified based on a number of the plurality of virtual containers added to the identified surface.

8. The method of claim 1,
   wherein the layout defines how the plurality of virtual containers, when added to the identified surface, can be placed by dynamically defining slots on the identified surface;
   wherein the identified at least one virtual container, when added to the identified surface, is assigned a slot, causing a location of the identified at least one virtual container to be set according to a location of the slot; and wherein the layout for the identified surface specifies a freeform layout wherein the slot is created on the identified surface, for the identified at least one virtual container, according to where the identified at least one virtual container was placed on the identified surface.

9. The method of claim 1, wherein the layout defines how the plurality of virtual containers, when added to the identified surface, can be placed by dynamically defining slots on the identified surface;

wherein the identified at least one virtual container, when added to the identified surface, is assigned a slot, causing a location of the identified at least one virtual container to be set according to a location of the slot; and wherein the layout for the identified surface is dynamic such that a number, size, and/or position of slots in the layout are specified in response to a number of the plurality of virtual containers, when added to the identified surface, a size of the plurality of virtual containers, when added to the identified surface, and/or where the plurality of virtual containers were initially placed on the identified surface.

10. The method of claim 1, wherein the identified surface is one or more of:

a surface positioned relative to an artificial reality system that controls the artificial reality environment;

a surface positioned relative to a real-world object detected by a machine learning recognizer trained to recognize one or more particular types of objects; or a surface positioned relative to a real-world surface determined to have at least minimum geometric features.

11. The method of claim 1, wherein the identified at least one virtual container was associated with the identified surface in response to one of:

a user performing an interaction to add the identified at least one virtual container to the identified surface;

the identified at least one virtual container having been created with an association to the identified surface based on a particular virtual container, that caused creation of the identified at least one virtual container, being on the identified surface; or execution of logic of the identified at least one virtual container or enablement of a particular display mode of the identified at least one virtual container, in response to the identified at least one virtual container having receiving context factors, that caused the identified at least one virtual container to be added to the identified surface.

12. A computing system for managing multiple virtual containers in an artificial reality environment, the computing system comprising:

one or more processors; and one or more memories storing instructions that, when executed by the one or more processors, cause the computing system to perform a process comprising:

receiving an identification of a surface in the artificial reality environment, wherein the identified surface has specified properties;

identifying at least one virtual container, of the multiple virtual containers, that is associated with the identified surface; and providing one or more of the specified properties of the identified surface to the identified at least one virtual container;

wherein the identified at least one virtual container is configured to evaluate, based on at least one of the specified properties of the identified surface, one or more conditions associated with display modes for the identified at least one virtual container, to select a current display mode for presenting the identified at least one virtual container in association with the identified surface; and wherein the current display mode, of the display modes, controls which content items, of a set of multiple content items of the identified at least one virtual container, are enabled for display in an area or a volume for the at least one virtual container wherein others of the set of multiple content items not enabled for the current display mode are not shown in the area or the volume.

13. The computing system of claim 12, wherein the specified properties include a surface type property of the identified surface that specifies an orientation of the identified surface; and wherein the identified at least one virtual container evaluates at least one of the one or more conditions to select the current display mode that corresponds to the orientation of the identified surface.

14. The computing system of claim 12, wherein the specified properties include a surface type property of the identified surface that specifies types of virtual containers that can be added to the identified surface.

15. The computing system of claim 12, wherein the specified properties include a layout that defines how a plurality of virtual containers added to the identified surface can be placed by defining slots on the identified surface; and wherein the identified at least one virtual container, when added to the identified surface, is assigned a slot, causing a location of the identified at least one virtual container to be set according to a location of the slot.

16. The computing system of claim 12, wherein the specified properties include a layout that defines how a plurality of virtual containers added to the identified surface can be placed by dynamically defining slots on the identified surface;

wherein the identified at least one virtual container, when added to the identified surface, is assigned a slot, causing a location of the identified at least one virtual container to be set according to a location of the slot; and wherein the layout for the identified surface specifies a freeform layout wherein the slot is created on the identified surface, for the identified at least one virtual container, according to where the identified at least one virtual container was placed on the identified surface.

17. The computing system of claim 12, wherein the specified properties include a layout that defines how a plurality of virtual containers, when added to the identified surface, can be placed by dynamically defining slots on the identified surface;

wherein the identified at least one virtual container, when added to the identified surface, is assigned a slot, causing a location of the identified at least one virtual container to be set according to a location of the slot; and wherein the layout for the identified surface is dynamic such that a number, size, and/or position of slots in the layout are specified in response to a number of the plurality of virtual containers, when added to the identified surface, a size of the plurality of virtual containers, when added to the identified surface, and/or where the plurality of virtual containers were initially placed on the identified surface.

18. The computing system of claim 12, wherein the identified surface is one or more of:
   a surface positioned relative to an artificial reality system that controls the artificial reality environment;
   a surface positioned relative to a real-world object detected by a machine learning recognizer trained to recognize one or more particular types of objects; or
   a surface positioned relative to a real-world surface determined to have at least a minimum set of geometric properties.

19. The computing system of claim 12, wherein the identified at least one virtual container was associated with the identified surface in response to one of:
   a user performing an interaction to add the identified at least one virtual container to the identified surface; or
   the identified at least one virtual container having been created with an association to the identified surface based on a particular virtual container, that caused creation of the identified at least one virtual container, being on the identified surface.

20. A non-transitory computer-readable storage medium storing instructions that, when executed by a computing system, cause the computing system to perform a process for managing interactions between two or more virtual containers, the process comprising:
   registering a relationship between the two or more virtual containers for sharing virtual container parameters;
   identifying, based on the registered relationship and while the two or more virtual containers co-exist in an artificial reality environment, an event related to the virtual container parameters; and
   in response to identifying the event, providing the virtual container parameters to at least one virtual container of the two or more virtual containers;
   wherein the at least one virtual container is configured to evaluate, based on at least one of the virtual container parameters provided to the at least one virtual container, one or more conditions associated with display modes for the at least one virtual container, to select a current display mode for presenting the at least one virtual container; and
   wherein the current display mode, of the display modes A) controls how the at least one virtual container writes content into a defined size or shape of an area or a volume set for the at least one virtual container in the current display mode, B) corresponds to a surface type property of an identified surface, and/or C) controls which content items, of a set of multiple content items of the at least one virtual container, are enabled for display in the area or the volume for the at least one virtual container wherein others of the set of multiple content items not enabled for the current display mode are not shown in the area or the volume.

\* \* \* \* \*